US006239815B1

(12) United States Patent
Frink et al.

(10) Patent No.: US 6,239,815 B1
(45) Date of Patent: May 29, 2001

(54) VIDEO DATA STORAGE AND TRANSMISSION FORMATS AND APPARATUS AND METHODS FOR PROCESSING VIDEO DATA IN SUCH FORMATS

(75) Inventors: Craig R. Frink, Chelmsford; Raymond D. Cacciatore, Westford; Hamed Eshraghian, Lexington, all of MA (US)

(73) Assignee: Avid Technology, Inc., Tewksbury, MA (US)

( * ) Notice: Subject to any disclaimer, the term of this patent is extended or adjusted under 35 U.S.C. 154(b) by 0 days.

(21) Appl. No.: 09/054,321

(22) Filed: Apr. 3, 1998

(51) Int. Cl.[7] .................................................. G09G 5/00
(52) U.S. Cl. ............................................ 345/502; 345/113
(58) Field of Search ................................... 345/132, 155, 345/202, 203, 502, 505, 113

(56) References Cited

U.S. PATENT DOCUMENTS

| | | |
|---|---|---|
| 4,677,421 | 6/1987 | Taniyama . |
| 4,965,668 | * 10/1990 | Abt et al. . |
| 5,081,450 | * 1/1992 | Lucas et al. .......................... 345/202 |
| 5,237,316 | 8/1993 | Cox, Jr. et al. . |
| 5,570,356 | 10/1996 | Finney et al. . |
| 5,649,217 | 7/1997 | Yamanaka et al. . |
| 5,673,065 | * 9/1997 | DeLeeuw .............................. 345/155 |

FOREIGN PATENT DOCUMENTS

| | | | |
|---|---|---|---|
| 0 647 067 A1 | 4/1995 | (EP) | ................................ H04N/5/94 |
| 2 269 922 | 2/1994 | (JP) | .................................. G06F/7/38 |

OTHER PUBLICATIONS

Symes, Peter D., "Ten-Bit Processing in an 8-Bit Environment," SMPTE Journal, pp. 444–446, Jun. 1989.

* cited by examiner

Primary Examiner—Jeffery Brier
(74) Attorney, Agent, or Firm—Wolf, Greenfield & Sacks, P.c.

(57) ABSTRACT

In order to efficiently use processing and transmission bandwidth and data storage of a computer system, video data is represented using integer and fractional values. The integer value has a precision defined by the precision of the data paths of the computer system. These integer and fractional components are packed into byte-oriented data packets in a manner that minimizes waste of storage space and transmission bandwidth. This packing of data also may be done in such a way so as to minimize processing for performing packing and unpacking of the data. Because the video data may be easily separated and combined into its integer and fractional components, these components may be processed or transported separately, in parallel or in series, and then later recombined. As a result, lower precision devices may be used in parallel to process or transport streams of higher precision data without having a high precision data processing or transport path.

2 Claims, 20 Drawing Sheets

VIDEO DATA STORAGE AND TRANSMISSION FORMATS AND APPARATUS AND METHODS FOR PROCESSING VIDEO DATA IN SUCH FORMATS

FIELD OF THE INVENTION

The present invention is related to systems for processing, transmission and storage of video data, where the video data has a precision that differs from the precision of a data processing or transport path.

BACKGROUND

Video data generally is composed of one to four components per pixel. Each component is represented using data of the same precision, and is commonly represented using a variety of precisions, such as 8-bit, 10-bit, 12-bit, 16-bit, 24-bit and 32-bit formats. The pixel rate generally is constant, regardless of the number of components or the precision of the components.

Processing, storage and transmission of video data having different precisions in a computer system may be difficult because a computer system typically has processing elements and data storage and transmission elements that are byte-oriented, i.e., the data paths have precisions that are integer multiples of 8-bits. Processing, storage and transmission of 10-bit and 12-bit video data using byte-oriented computing equipment may result in inefficient use of transmission and processing bandwidth and data storage. Although some computer systems have 16-bit, 32-bit and 64-bit data paths, video processing equipment that has such a precision is typically expensive.

SUMMARY

In order to efficiently use processing and transmission bandwidth and data storage of a computer system, video data is represented using integer and fractional values. The integer value has a precision defined by the precision of the data paths of the computer system. These integer and fractional components are packed into byte-oriented data packets in a manner that minimizes waste of storage space and transmission bandwidth. This packing of data also may be done in such a way so as to minimize processing for performing packing and unpacking of the data.

Because the video data may be easily separated and combined into its integer and fractional components, these components may be processed or transported separately, in parallel or in series, and then later recombined. As a result, lower precision devices may be used in parallel to process or transport streams of higher precision data without having a high precision data processing or transport path.

Accordingly, in one aspect, a computer-readable medium has computer-readable signals defining a data structure recorded thereon. The data structure represents video data defined by a plurality of components having a first precision, for use by a video device operating on the video data using a second precision smaller than the first precision. The data structure includes an integer portion defined by higher order bits of a video component, wherein the precision of the integer portion is defined by the second precision, and a fractional portion defined by lower order bits of the data for a video component, wherein the precision of the fractional portion is defined by a difference between the first precision and the second precision. In one embodiment, the fractional portions for video components of a pixel are stored such that one or more fractional portions are present in a data word of the second precision and the fractional portion is stored in one data word of the second precision.

In another aspect, a process for generating a representation of video data defined by a plurality of components having a first precision, for use by a video device operating on the video data using a second precision smaller than the first precision, the representation including an integer portion defined by higher order bits of a video component, wherein the precision of the integer portion is defined by the second precision and a fractional portion defined by lower order bits of the data for a video component, wherein the precision of the fractional portion is defined by a difference between the first precision and the second precision. The process involves receiving data for each component of the video data in the first precision. The fractional portions of the components of the video data are combined into data in the second precision. The integer portions of the components of the video data are output in the second precision. In one embodiment, the fractional portions are multiplexed into a first data word and a sequence of integer portions are latched into separate data words. The output provided is the first data word and the integer portions. In another embodiment, the fractional portions are read from a first memory location. The fractional portions are combined into data words in a second memory location. The integer portions are read from a third memory location and are combined into data words in a fourth memory location.

Another aspect is a process for accessing data in a representation of video data defined by a plurality of components having a first precision, for use by a video device operating on the video data using a second precision smaller than the first precision, the representation including an integer portion defined by higher order bits of a video component, wherein the precision of the integer portion is defined by the second precision and a fractional portion defined by lower order bits of the data for a video component, wherein the precision of the fractional portion is defined by a difference between the first precision and the second precision. The process involves receiving the data defining the integer and fractional components of the video data. The fractional portions of each component of the video data are combined with the integer portion of each component of the data into data having the first precision. In one embodiment, the fractional portions are demultiplexed from a first data word. Each fractional portion of a component is combined with the integer portion of the component and is provided as an output data in the first precision. In another embodiment, the fractional portions are read from a first memory location. The integer portions are read from a second memory location. The fractional portions and integer portions of a component are combined into data having the first precision.

Another aspect is a method for processing video data defined by a plurality of components having a first precision using video devices operating on the video data using a second precision smaller than the first precision, wherein the video data is stored in a format defining an integer portion defined by higher order bits of a video component, wherein the precision of the integer portion is defined by the second precision and a fractional portion defined by lower order bits of the data for a video component, wherein the precision of the fractional portion is defined by a difference between the first precision and the second precision data. The method involves processing the integer portion of the video data using a first video processing device. The fractional portion of the video data is processed using a second video processing device. The results obtained by processing the fractional portion and the integer portion are combined into data in first precision.

Another aspect is a method for processing video data defined by a plurality of components having a first precision using a video processing device operating on the video data using the first precision, wherein the video data is transported to the video processing device using video devices having a data path having a second precision smaller than the first precision, wherein the video data is stored in a format defining an integer portion defined by higher order bits of a video component, wherein the precision of the integer portion is defined by the second precision and a fractional portion defined by lower order bits of the data for a video component, wherein the precision of the fractional portion is defined by a difference between the first precision and the second precision data. The method involves transporting the integer portion of the video data to the video processing device using a first video device. The fractional portion of the video data to the video processing device is transported using a second video device. The integer and fractional portions of the video data are combined to be input to the video processing device, where the video data is processed.

Other aspects of the invention include systems for transporting data in the integer and fractional format, in which devices sending and receiving data have packing and unpacking logic. Other aspects of the invention include devices and systems corresponding to the processes described above.

DETAILED DESCRIPTION

Figure 1A:
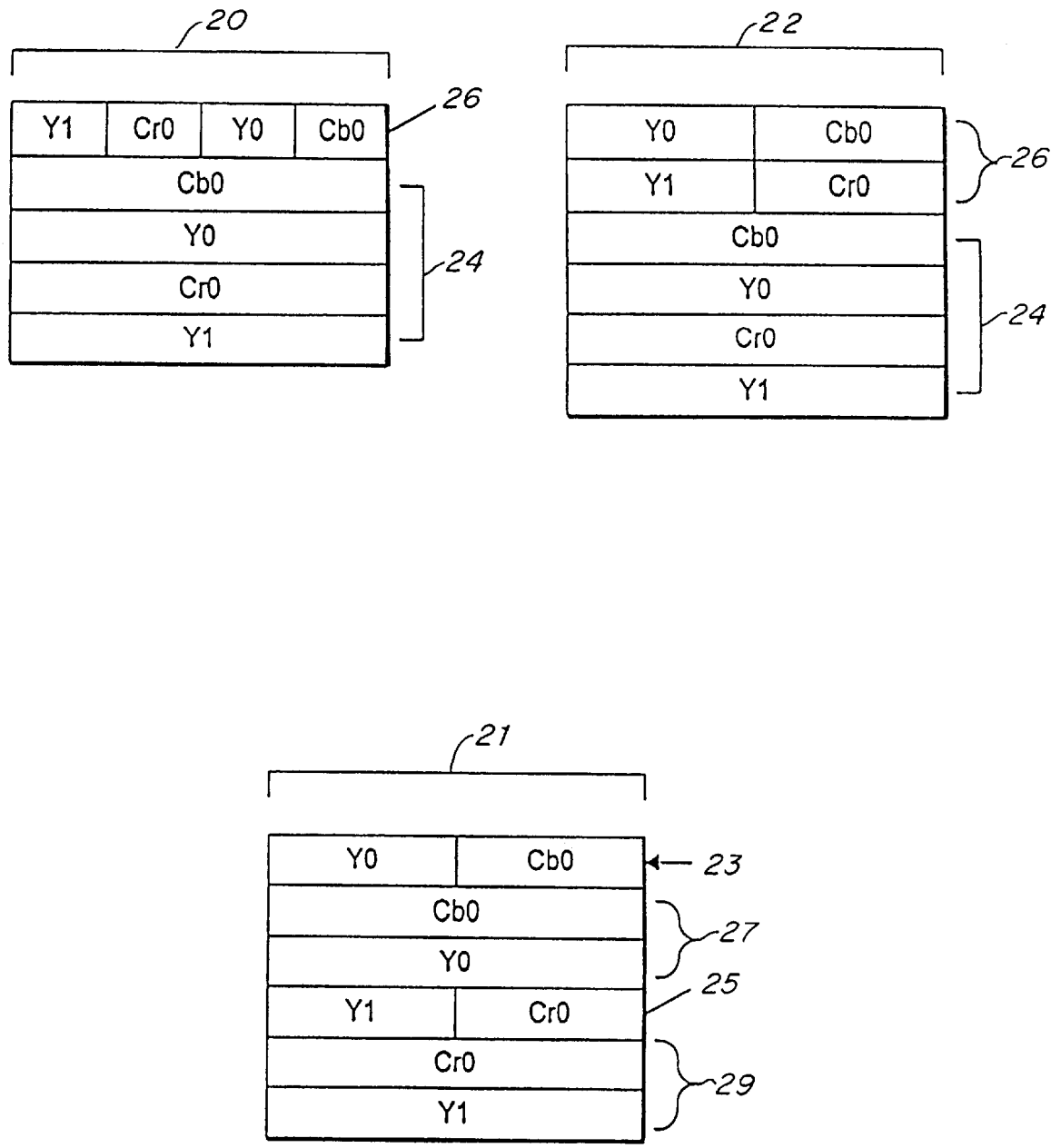
FIGS. 1A–1G illustrate formats for packed video data in different embodiments.

Video data is commonly defined by a plurality of components such as red, green and blue, luminance and either chrominance or hue and saturation, alpha values, or other component indicative of color and sometimes command data. Video processing equipment generally represents these components using precisions including 8-bit, 10-bit, 12-bit, 16-bit, 24-bit and 32-bit data. Other precisions also are possible. However, in a system that combines video devices and computer systems, one device may use a precision that is different from the precision used on another devices. For example, an 8-bit computer system may be connected to a 10-bit video processing device.

In order to store and transport video data so that it may be readily processed and transported by many different video devices and computer systems, an integer portion of the video data is defined by the high order bits of a video component. The precision of the integer portion is defined by the precision of a data path used for transmission or storage of the data. A fractional portion is defined by lower order bits of the data for a video component. The precision of the fractional portion is defined by the difference between the precision of the video data and the precision of the integer portion. The fractional portion of a component is stored in one data word having the same precision as the integer portion. One or more fractional portions of different components may be stored in single data word. For example, four components of 10-bit video data may be packed as four 8-bit integer data words in one 8-bit data word including four 2-bit fractional portions of these components.

When the packed data is used on video devices operating at a lower precision, the fractional portions may be dropped. These fractional components also may be used to compute a more accurately truncated, or rounded, integer portion. The higher precision data also may be reconstructed from the packed data and applied to devices that operate on higher precision data. Alternatively, the integer and fractional portions may be processed or transported separately by lower precision devices. The results of the processing performed on the integer and fractional portions may be combined to produce the higher precision data. The higher precision data may be reprocessed into integer and fractional portions.

Several example embodiments of the packed data will now be described in connection with FIGS. 1A–1G. These formats may be used for transmission and storage. Methods and devices for unpacking and packing data in these formats are described in more detail below. The formats in all of FIGS. 1A–1G use little endian byte ordering. A datum at the top of a figure is assumed to occur first in time. Different bytes orderings may be used in other embodiments. When using a data flow control protocol to interconnect different processing devices, these formats permit a valid signal to be asserted for any of the components in video data including these packets, instead of separating packets to transmit only one portion of the data. Data flow control is described in the following U.S. Patent Applications, incorporated by reference herein: U.S. patent application Ser. No. 08/879,981; U.S. Patent Application entitled "Apparatus and Method for Controlling Transfer of Data Between and Processing of Data by Interconnected Data Processing Elements," filed Apr. 3, 1998, by Craig R. Frink et al.; and U.S. Patent Application entitled "A Packet Protocol for Encoding and Decoding Video Data and Data Flow Signals and Devices for Implementing the Packet Protocol," filed Apr. 3, 1998 by Craig R. Frink, et al.; and U.S. Patent Application entitled "Method and Apparatus for Controlling Data Flow Between Devices Connected by a Memory," filed Apr. 3, 1998 by Craig R. Frink.

FIG. 1A illustrates 4:2:2 video data in a 10-bit precision packed into an 8-bit format at 20 and packed 12-bit data at 22. 4:2:2 video data is the most common type of video data. It includes one luma component (Y) per pixel and shares two chroma components (Cr, Cb) between two adjacent pixels, averaging out two components per pixel. In FIG. 1A, five bytes are used to define two pixels of 10-bit 4:2:2 video. Six bytes are used for 12-bit 4:2:2 video. The last four bytes 24 indicate the most significant video data. The least significant video data bits from the four components are combined to form the first byte 26 of the 10-bit video data, and the first and second bytes of the 12-bit video data. The most significant video data bytes are contiguous in the byte stream, preceded by the least significant bits of the video data which are concatenated into one or two bytes. As an alternative, for 12-bit video data as shown at 21, the first and fourth bytes 23 and 25 may include the least significant video data bits. The second and third bytes 27, and fifth and sixth bytes 29 include the most significant video data bits.

4:2:2:4 video data has one luma component and one alpha component per pixel and shares the chroma components between two adjacent pixels, as for 4:2:2 video data. There are two forms of 4:2:2:4 video data: a first form uses an 8-bit alpha component (shown in FIG. 1B), a second form uses an alpha component having the same precision as the other components (shown in FIG. 1C). In both formats, the alpha components are separate from and follow the luma and chroma components in the packed data so that the same method or device may be used to assemble the video portion of both 4:2:2 and 4:2:2:4 video data.

Figure 1B:
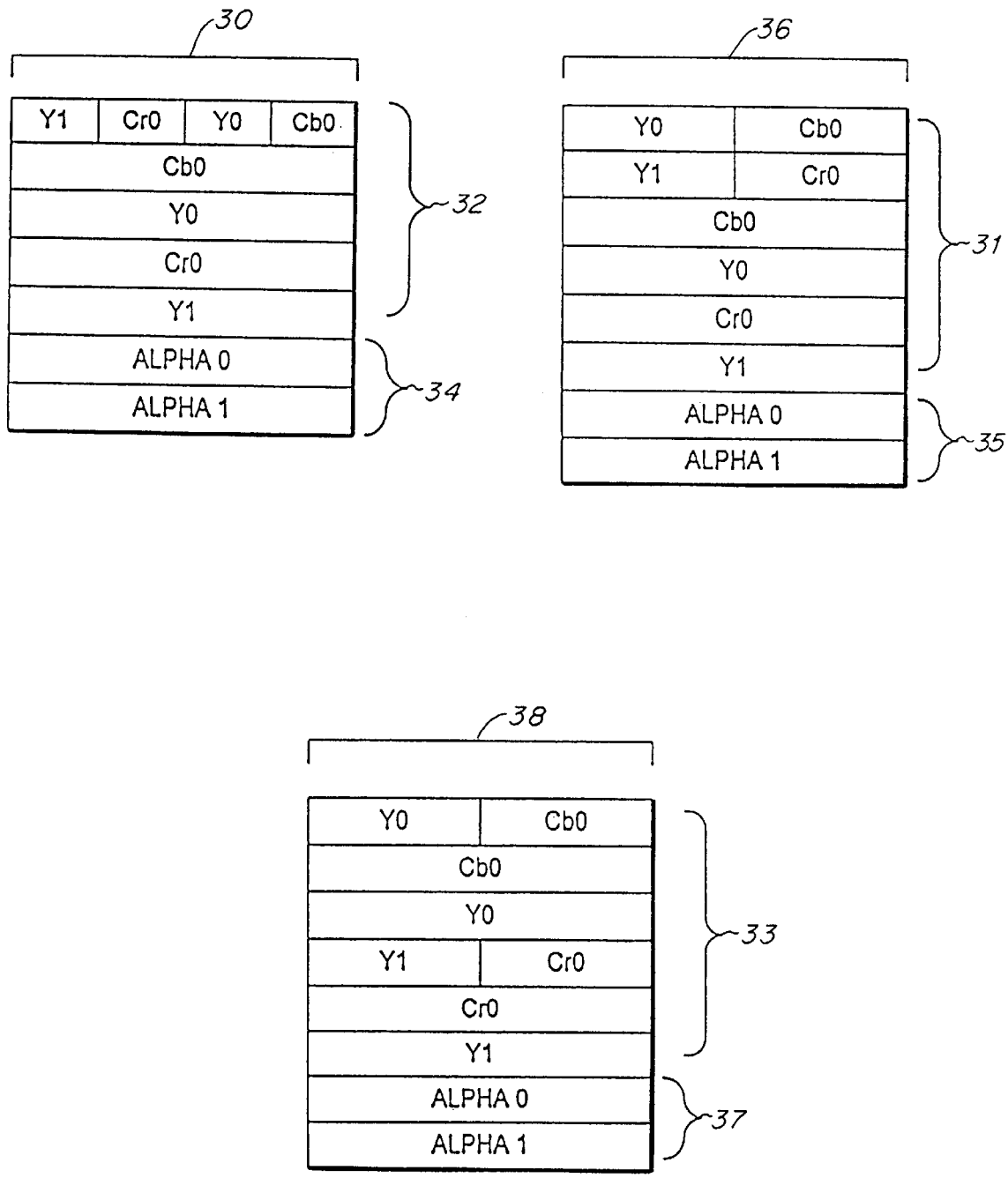
Figure 1C:
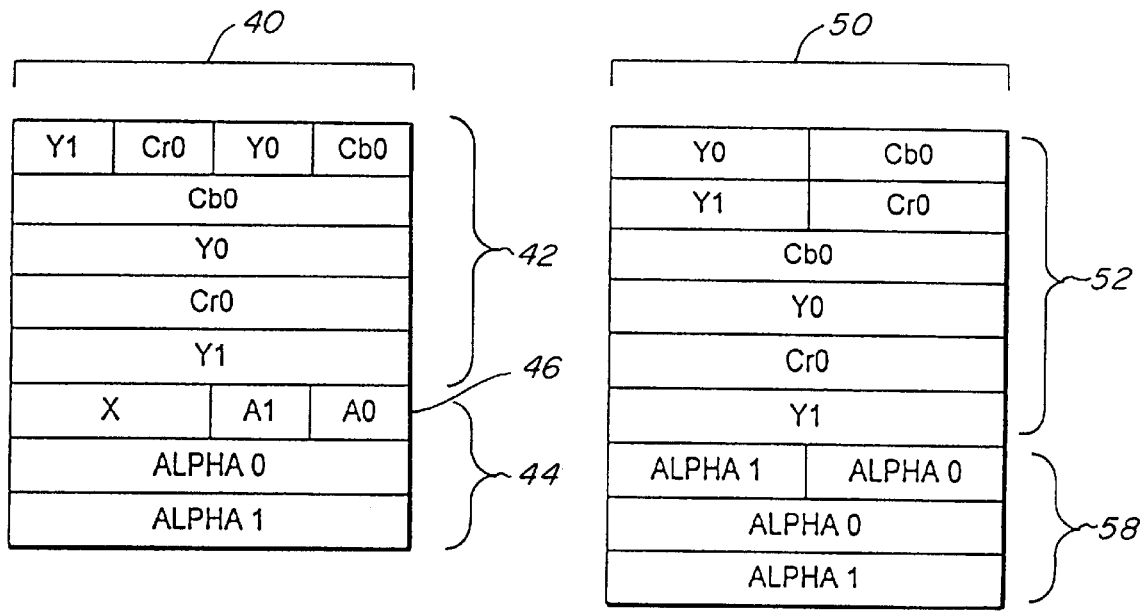
Figure 1C:
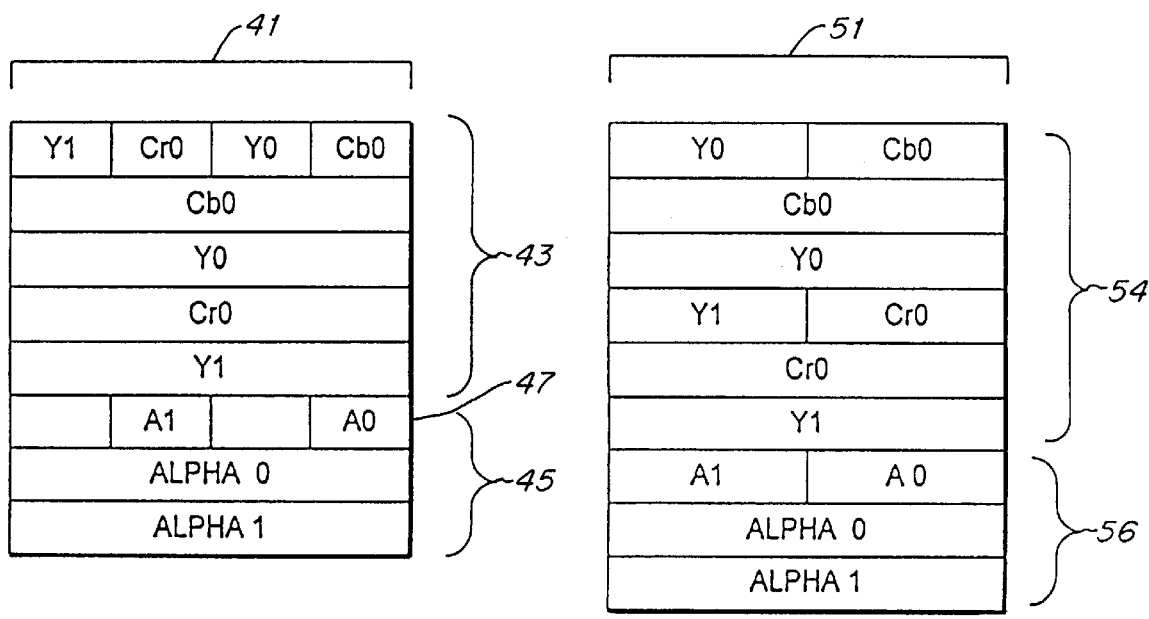
Figure 10:
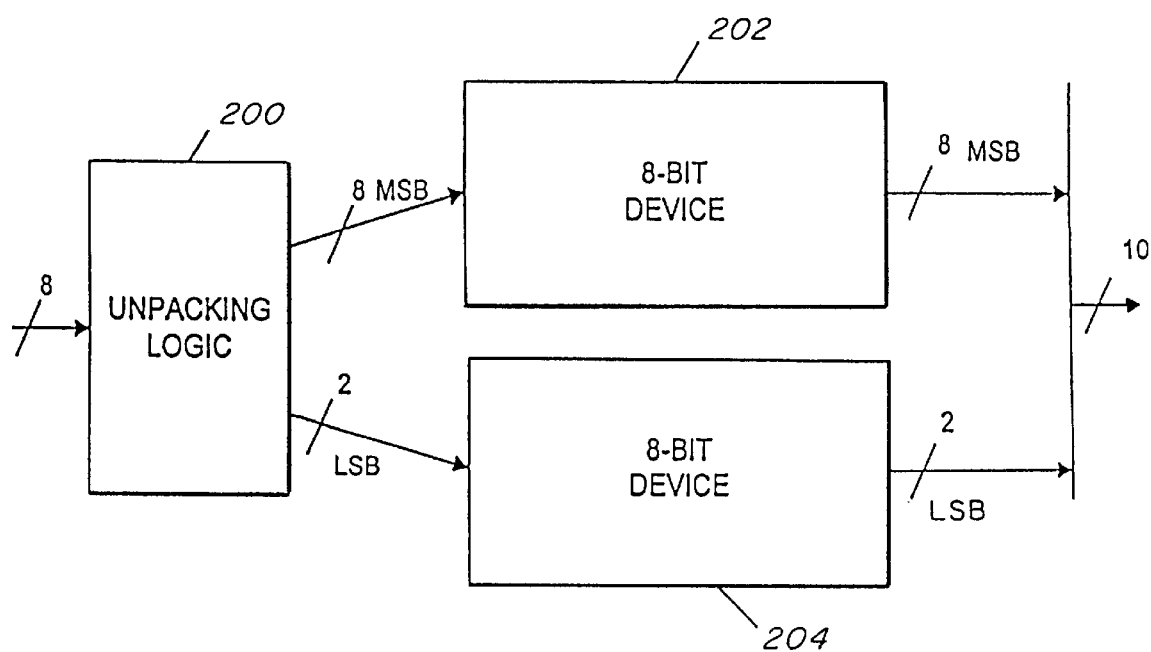
FIG. 10 is a block diagram of a system which transports integer and fraction portions of packed data separately.

In FIG. 1B, 10-bit data is shown at 30. The component values 32 are packed in the same manner as the 10-bit video data 20 in FIG. 1A. The alpha values 34 are concatenated at the end of the packed data stream. Similarly, with 12-bit video data 36 and 38, component values 31 and 33 are followed by alpha values 35 and 37. Referring now to FIG. 1C, for 10-bit alpha data shown at 40 and 41, the fractional portions of the alpha data may be packed into one byte in several ways. The component data 42 and 43 may be the same as shown in FIGS. 1A and 1B. The alpha data 44 and 45 may differ in how the fractional data 46 and 47 are stored in a single data word. With respect to the 12-bit video data shown at 50 and 51, the same component formats 52 and 54 as shown in FIGS. 1A and 1B are used. The alpha data 54 and 56 is packed in a similar manner.

Figure 1D:
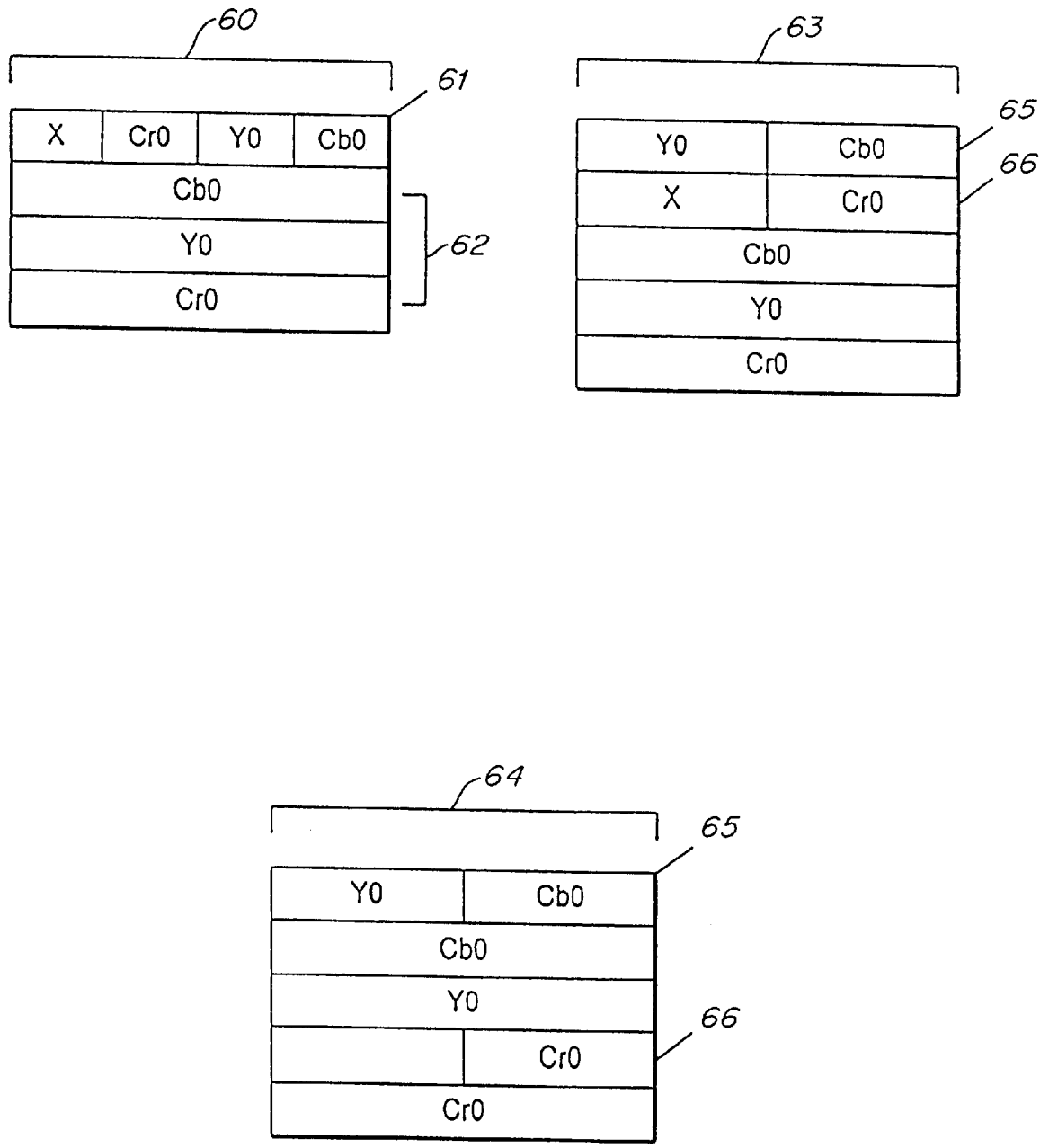

FIG. 1D illustrates 4:4:4 video, which uses three component values per pixel, in 10-bit and 12-bit precisions packed into an 8-bit format. For 10-bit video data shown at 60, the first word 61 in the packed data format includes two least significant bits of the three components. Since there are three components in the sequence, two bits of the first word, such as the two most significant bits, are not used. The order of the fractional portions in the first byte corresponds to the order of the integer portions in the remaining bytes 62 of the sequence. 10-bit 4:4:4 video data uses four bytes per pixel; 12-bit 4:4:4 video data 63 and 64 uses five bytes per pixel. For 12-bit video data, the first byte 65 includes the four least significant bits for the first two components in the sequence (Cb and Y). In one embodiment 63, the second word 66 includes the four least significant bits for the Cr component. The remaining four bits are not used. In another embodiment, the data word 66 for the Cr component is the fourth byte. This method for packing 4:4:4 video data does not use all the bits in a sequence, but yields a method for packing and unpacking consistent with methods used for other formats. Alpha data also may be packed with this format using formats similar to those shown in FIGS. 1B and 1C.

Figure 1E:
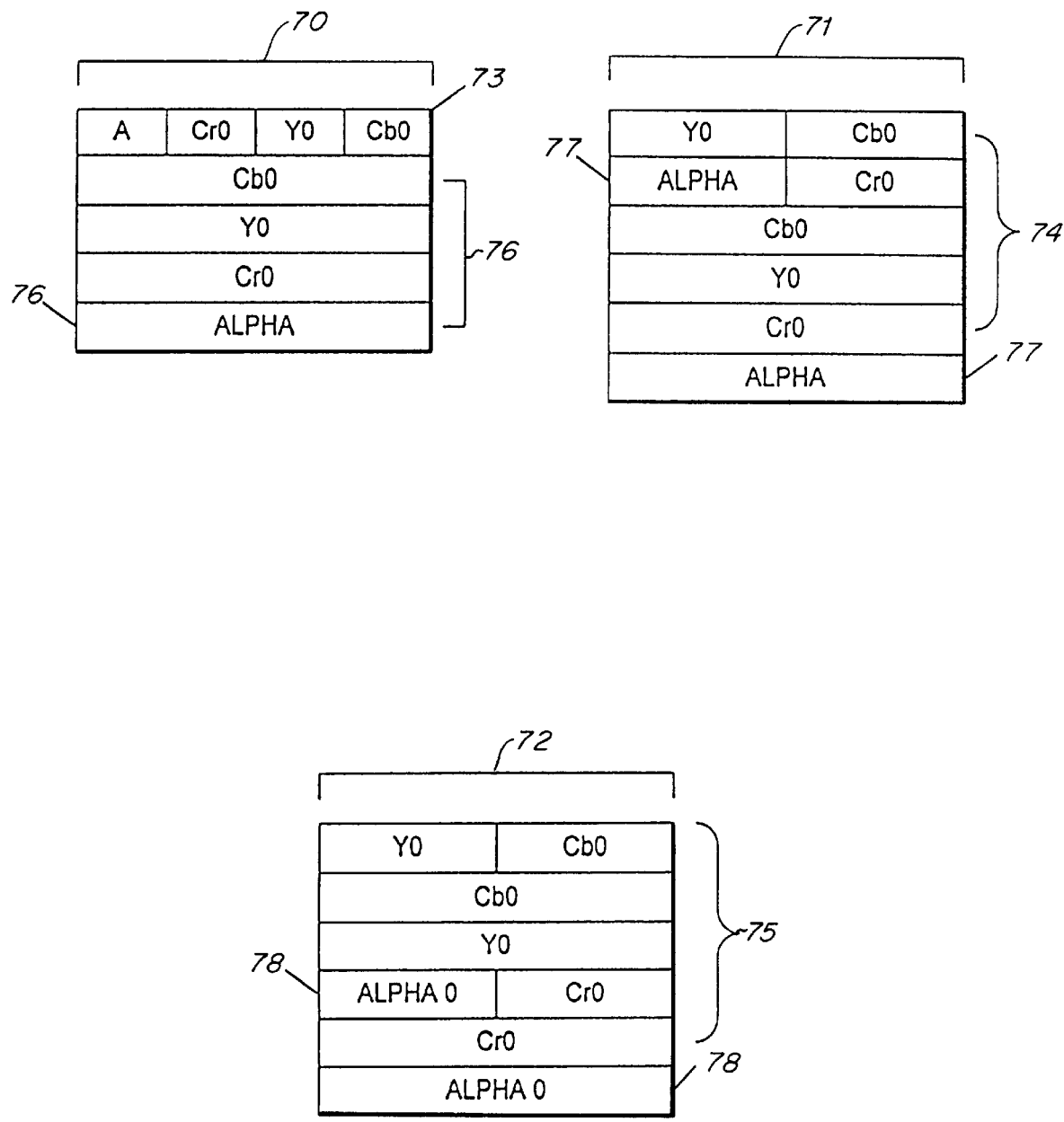

FIG. 1E illustrates 4:4:4:4 video data in 10-bit and 12-bit formats packed into an 8-bit format. This format is the largest video format currently used, and includes four components per pixel. Five bytes are used to transfer and store 10-bit video data 70; six bytes are used to transfer and store 12-bit video data 71 and 72. These formats are similar to the formats shown in FIG. 1D for the component data 73, 74 and 75 and add the alpha data 76, 77 and 78, which results in all bits being used in each data word.

Figure 1F:
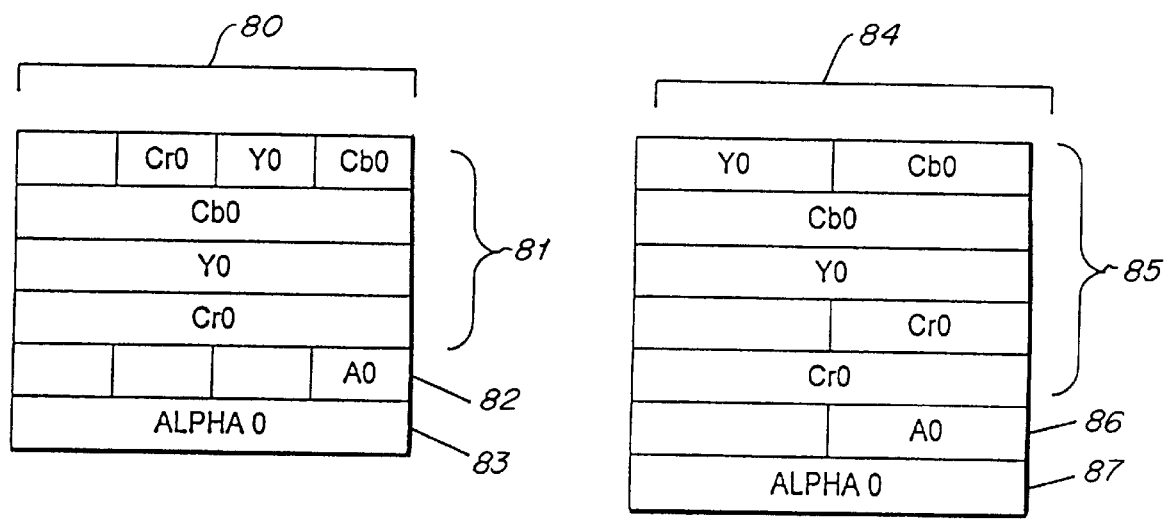

In some applications, the 4:4:4 video data and the alpha data may be separated from each other in a data stream, or combined. A less efficiently combined 4:4:4 video and alpha stream may be useful in this circumstance, as shown in FIG. 1F. In this embodiment, for 10-bit data 80 the component data 81 is identical to FIG. 1D. The least significant video data bits of the alpha data appear in the fifth byte 82 with six bits wasted. The final byte 83 includes the most significant data bits of the alpha data. Similarly, for 12-bit video data 84, the format of the component data 85 is identical to FIG. 1D. The sixth byte 86 represents the fractional portion of the alpha data. The seventh byte 87 includes the integer portion of the alpha data.

Figure 1G:
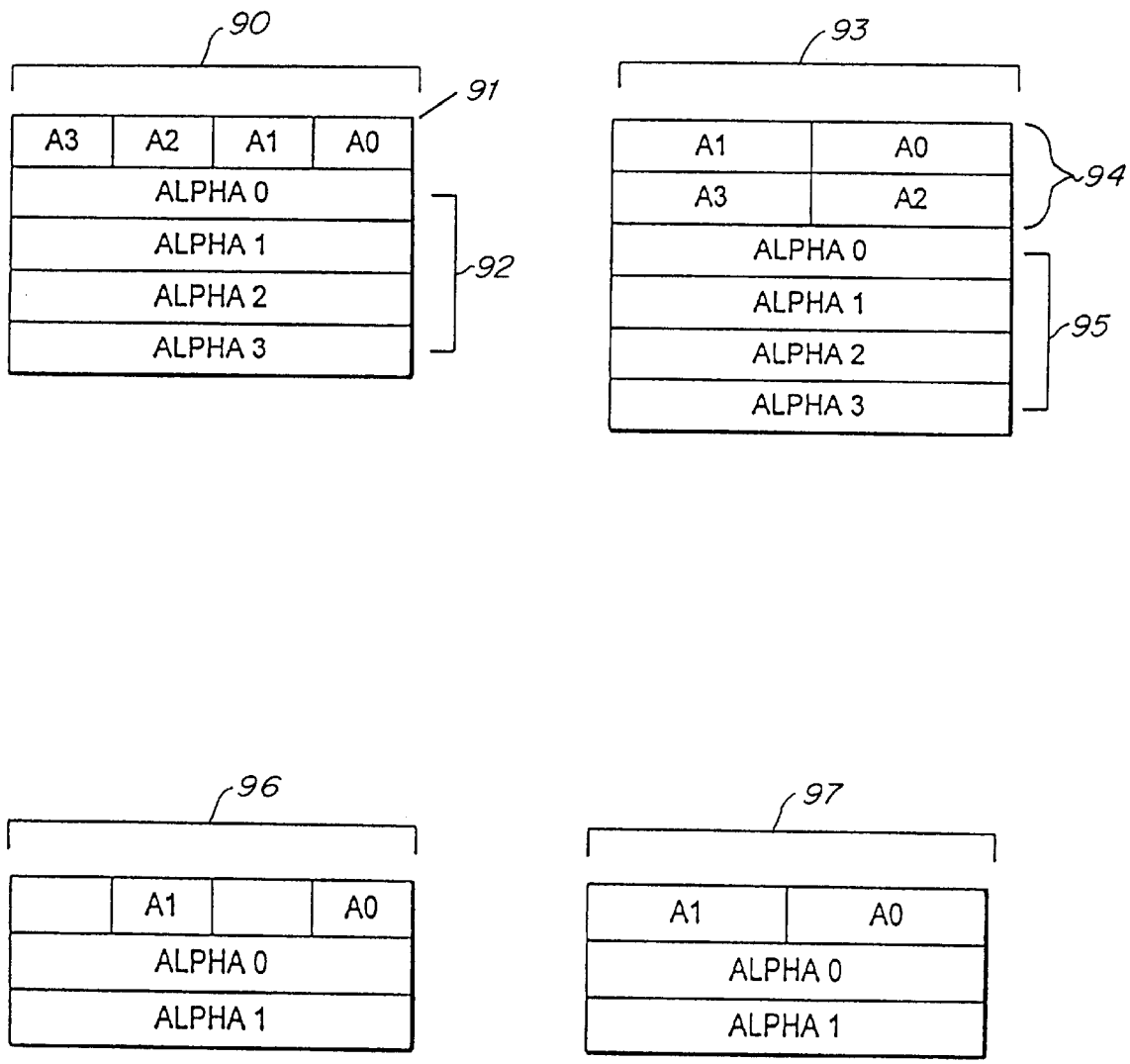

A single component of four pixels of video data also may be packed. For example, FIG. 1G shows four pixels of 10-bit alpha data 90 packed into an 8-bit format. The 10-bit alpha data is represented by a first byte 91 including the two least significant bits of a component of a pixel. The most significant video data bits are in separate bytes 92 following the byte including the least significant video data. Similarly, 12-bit video data 93 is represented by two bytes 94 including the least significant four bits of a component of the 12-bit video data and four bytes 95 containing the most significant eight bits of a component. Two pixels of 10-bit and 12-bit component data also may be packed together as shown at 96 and 97, which results in the same number of output bytes for either 10-bit or 12-bit data.

Additional formats may be used to pack 12-bit data into 10-bit formats. Additionally, 8-bit, 10-bit, 12-bit and other precision data may be packed into other formats, such as 10-bit, 12-bit, 16-bit and 32-bit formats. 16-bit and higher precision data may be packed in a similar manner. In this format, the fraction may appear first in the packed data. However, the bytes for a given component may remain contiguous in the data stream if the integer and any fractional portions have the same precision. Data packed in such formats may be stored and/or transmitted in the format and unpacked for processing.

The packed data formats may be stored to a memory and to disk and they may be used by a video processing device. In some devices a modified version of the packed data stream may be beneficial. For example, separating the alpha components from the video data may be beneficial if the alpha stream is processed independently from the video using another device. With alpha data stored separately, the task of accessing and using the alpha stream may be simplified. It also may be beneficial to combine a separate alpha stream with video data to simplify the task of accessing both kinds of the data when they are processed together. As another example, data may be separated for both packing and unpacking in order to provide sufficient throughput to or from a device.

Figure 2:
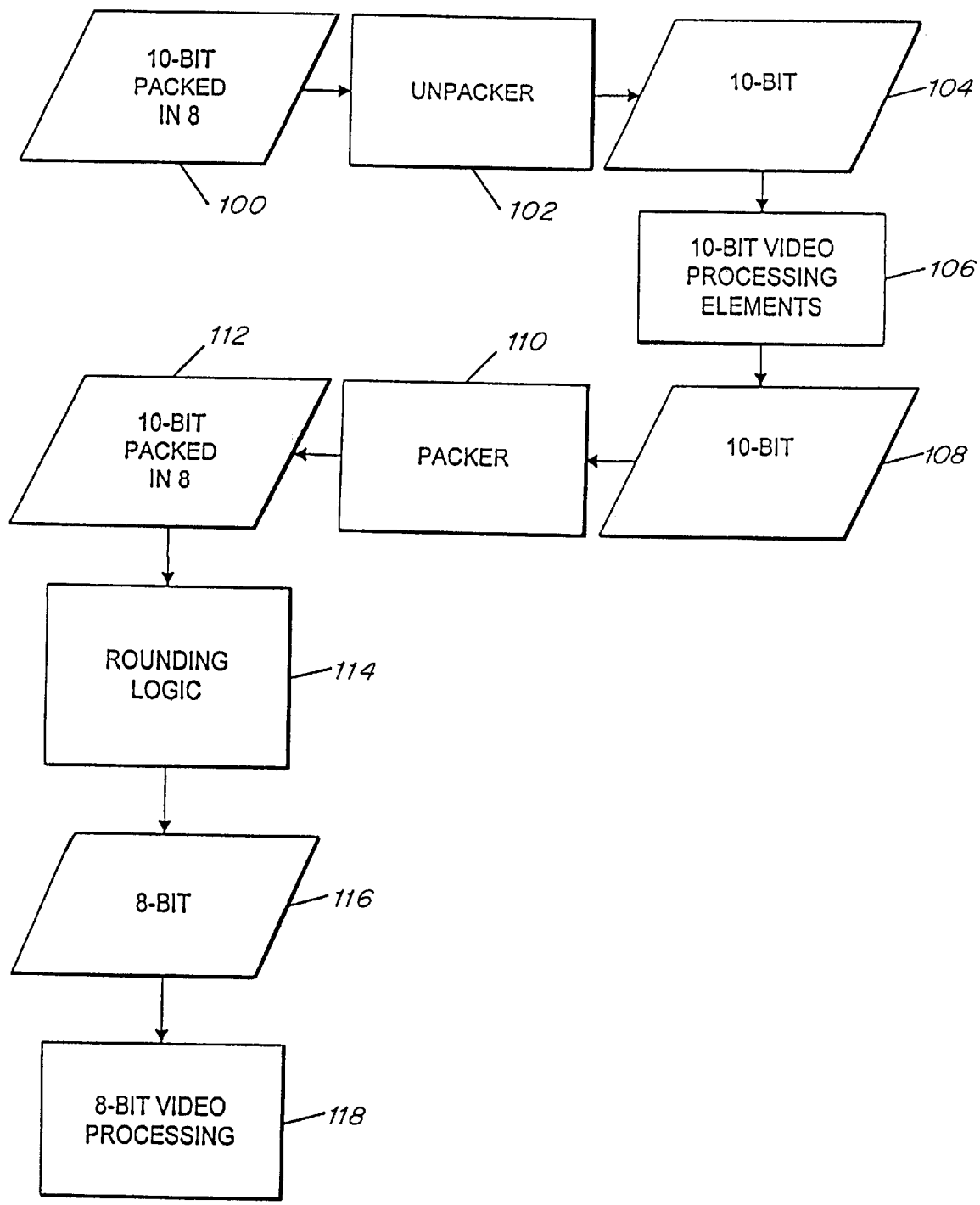
FIG. 2 is a block diagram of a system in which packed data is unpacked into higher precision data to be processed, and the higher precision data is packed for transmission and storage.

How these and similar formats may be used will now be described in more detail. FIG. 2 illustrates a general diagram of a system in which packed data formats such as those shown in FIGS. 1A–1G may be used. This example is provided for 10-bit video data packed into an 8-bit format. In FIG. 2, 10-bit data packed into an 8-bit format, as indicated at 100, is input to unpacking logic 102 to produce 10-bit data 104. This 10-bit data 104 is applied to a 10-bit video processing element 106. The 10-bit video processing element provides a 10-bit output data, as indicated at 108. 10-bit output data is applied to packing logic 110 to pack the 10-bit data into an 8-bit format, as indicated at 112. The 10-bit data may be processed by rounding or truncation logic 114 to produce 8-bit data 116 which may be provided to an 8-bit video processing element such as indicated at 118.

The processing elements 106 and 118 may be any standard 10-bit or 8-bit video processing elements. The 10-bit and 8-bit formats, 104, 108 and 116 may be standard format video data. The data packed in an 8-bit format (100 and 112) may be any of the formats shown in FIGS. 1A through 1G or other similar formats. The rounding or truncation logic 114 typically includes a form of unpacking logic 102 to produce 10-bit data which then may be truncated by dropping the fractional portions or may be rounded using standard techniques to produce 8-bit data.

Figure 3:
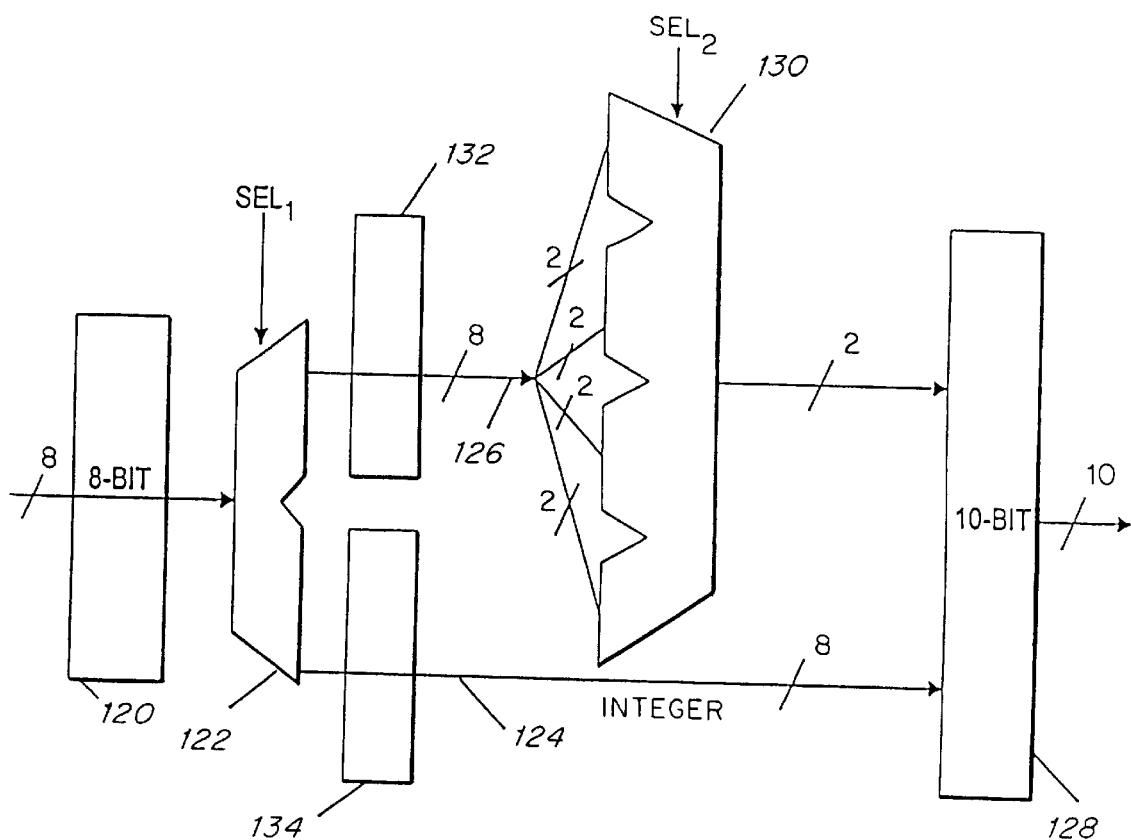
FIG. 3 is a block diagram of one embodiment of a circuit for unpacking packed data of a given format.

Unpacking logic 102 and packing logic 110 will now be described. One embodiment of a circuit for unpacking packed data is shown in FIG. 3. This embodiment is useful for processing packed data in the format shown at 20 in FIG. 1A. The 8-bit data is input to an 8-bit register 120. A multiplexer 122 directs the 8-bit data to either an integer data path 124 or a fractional data path 126. The integer data path is input to the most significant bits of a 10-bit register 128. The fractional data path is divided into four 2-bit data paths which are input to a multiplexer 130. The multiplexer 130 outputs two bits which are the inputs to the least significant bits of the 10-bit register 128. The output of the 10-bit register 128 is the unpacked 10-bit data. The multiplexers 122 and 130 are controlled by select signals $SEL_1$ and $SEL_2$. The signal $SEL_2$ corresponds to the component which is presently on the integer data path 124. The control signal $SEL_1$ corresponds to the byte order of the packed data in order to direct fractional data to the data path 126 and integer data to the data path 124. Latches 132 and 134 are used to maintain valid data and timing in both the integer and fractional data paths during the unpacking operation. This circuit permits several packets to be unpacked in a pipeline manner with maximum throughput. An additional latch may be used in the fractional data path to accommodate having two bytes of fractional data.

One embodiment of a circuit for packing data will now be described in connection with FIG. 4. This embodiment is useful for packing data into a format shown at 20 in FIG. 1A. This circuit receives 10-bit component data and outputs first a byte of combined fractional data from the components and then the bytes of integer data of the components. Accordingly, the input 10-bit data is divided into an integer data path 140 having an 8-bit precision and a fractional data path 142 having a 2-bit precision. The integer portion is latched by five latches 144, 146, 148, 150 and 152. The output of latch 152 is input to a multiplexer 154, under control of the selection signal $SEL_3$, which provides an output to a latch 156 which outputs an 8-bit data stream. The fractional data is input to shift registers 158 and 160, one shift register for each bit, which accumulate the least and second to least significant bits in the fractional data steam. The outputs of shift registers 158 and 160 are combined to provide a packed data byte, such as shown in the formats of FIGS. 1A through 1F, which is input to the second input of multiplexer 154. The select signal $SEL_3$ switches the output of the multiplexer 154 in accordance with the desired packing. For example, it outputs a first byte from the fractional data path and then outputs four bytes from the integer data path.

Figure 4:
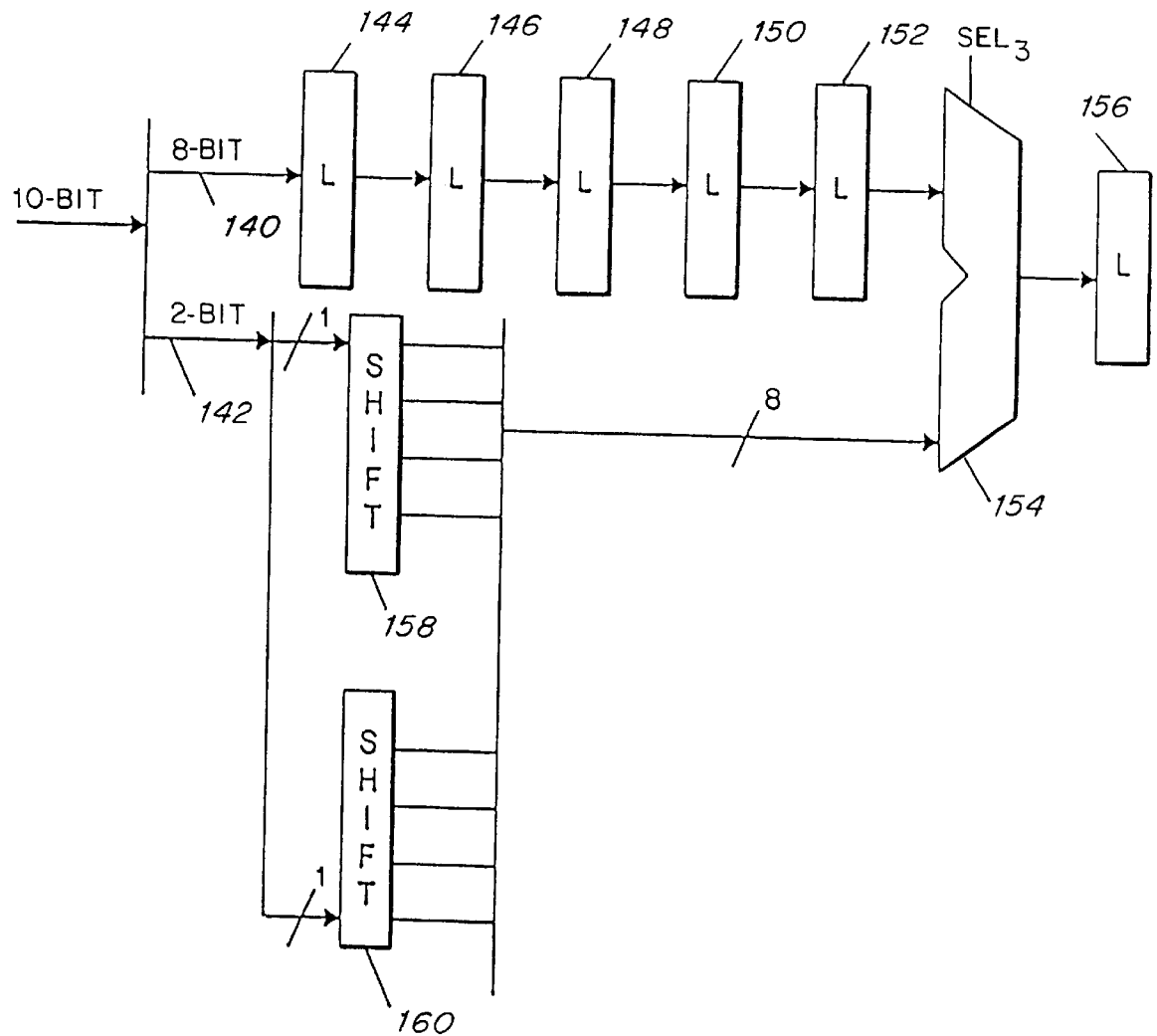
FIG. 4 is a block diagram of one embodiment of a circuit for packing data.

Additional or fewer latches may be provided in the circuits of FIGS. 3 and 4 depending on the desired format of the packed data. Variations to the logic shown in FIGS. 3 and 4 may be used to provide a different order of the fractional and integer parts in the packed data. The precision of the data paths in the packing and unpacking logic may be changed according to the desired precision of the output data and the precision of the input data. Another design may include an input multiplexer that directs each component value into a separate register and an output multiplexer that provides the desired data from the registers.

Another method for packing and unpacking data, particularly into memory, is by using multichannel scatter/gather direct memory access (DMA). Using this method, multiple representations of the data may be provided. A single data stream format may be created for storage to disk, or the data may be separated into its different components. Using a single stream may simplify data management in certain applications when the video and alpha data are always associated. Additionally, creating a single file improves performance of the system. Direct memory access also may be used to deconstruct the packed data from storage into separate data files for different components or for direction to separate video processing devices. The DMA method also permits reconstruction of a single data stream from separate streams.

Figure 5:
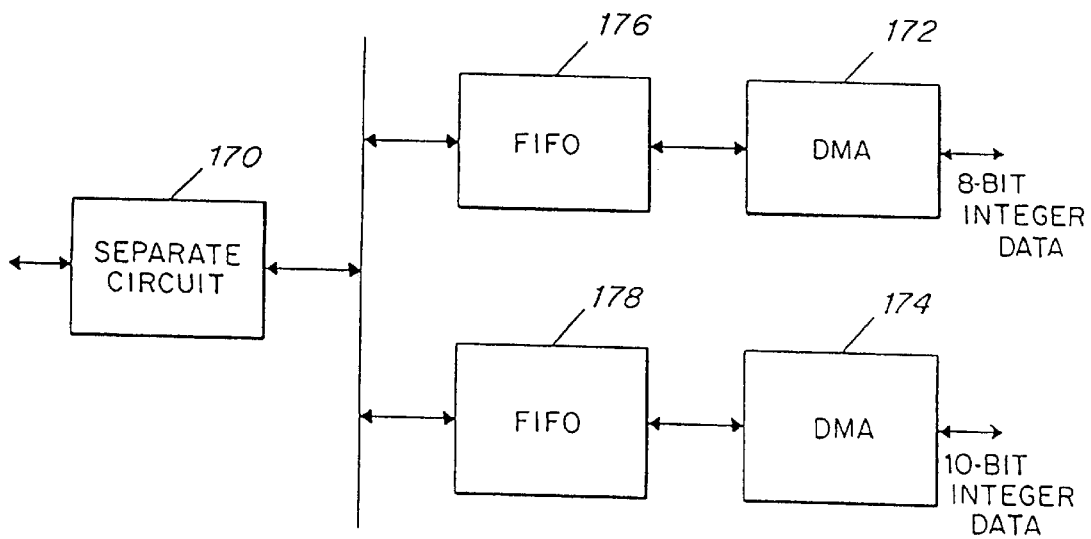
FIG. 5 is a block diagram of another embodiment of a circuit for packing and unpacking video data.

FIG. 5 illustrates a device which separates a component data stream into a video integer stream on one channel and a video fraction and alpha integer and fraction stream on another channel. In this example, component video data is separated into integers and fractions using a stream separation circuit 170. This circuit 170 may be implemented using host memory of a computer. Two DMA channels, each including a DMA engine (172, 174) and first-in/first-out (FIFO) memory (176, 178) further separate the data into separate locations in memory. The DMA channel having DMA 172 and FIFO 176 provides a data path that reads and transfers the integer portion of the video data using scatter/gather DMA. The integer data may be directed to a lower precision processing device or may be combined with the fractional data to be provided to a higher precision processing device.

There are several possible memory formats for writing packet data to memory. In most formats, the video and alpha components are combined into a single memory image that represents a single video frame. The components of the video and alpha streams may be grouped or separated. Using scatter/gather DMA, contiguous data streams, discontiguous streams with the components grouped together, and separate buffers for the components may be created. A linked list structure of a scatter/gather DMA provides flexibility when creating multiple buffers which store blocks of data having a fixed size. A DMA engine may transfer a contiguous array of data at a given offset and then may relink to a new offset. A DMA channel is capable of accessing the memory and transferring data to a different offset. In one format, the data may be stored in memory as an array of packed byte data. In this embodiment, the video is written in sequence for each image of the video, such as each field or frame, and the images of video are concatenated in sequence. It is also possible to separate the video and alpha streams using two DMA channels, and may be directed to separate video and alpha memory buffers. A scatter/gather DMA may concatenate them in sequence in the same memory.

Figure 6:
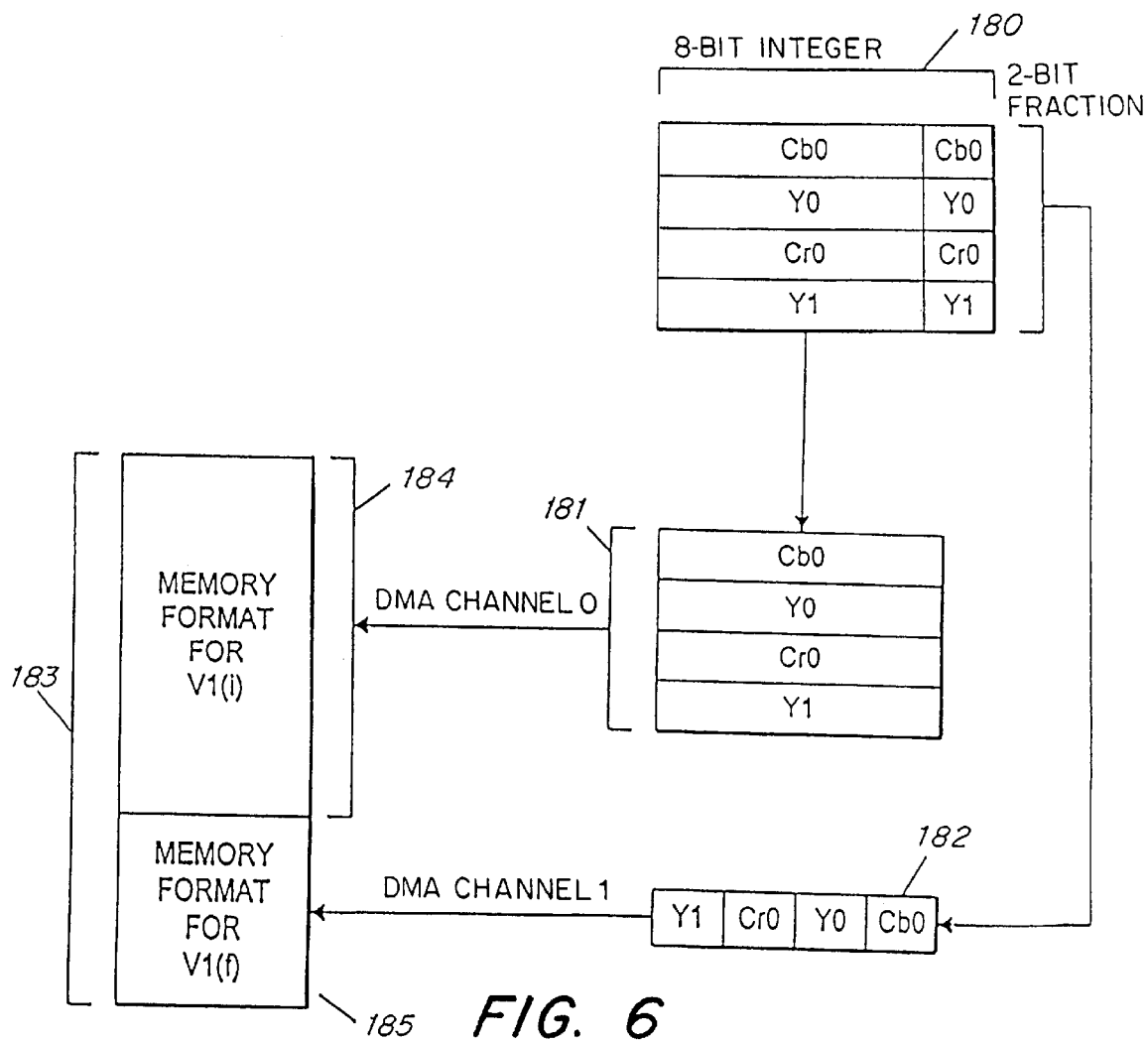
FIG. 6 is a diagram illustrating operation of one embodiment of the circuit of FIG. 5.

FIG. 6 illustrates schematically an embodiment in which 10-bit 4:2:2 component video data is separated into an integer portion 181 and a fractional portion 182. These portions are further separated into separate locations 184 and 185 in a memory 183 using two DMA channels. In a similar embodiment, the component stream may be separated into an 8-bit integer and 2-bit fractions for the purpose of creating a 4:2:2 video stream that can be read into an 8-bit video processing device using a single scatter/gather DMA. An 8-bit system may have a scatter/gather DMA, e.g., using link lists, that may read the 4:2:2 8-bit integer portion of the data stream. In the example shown in FIG. 6, a complete video stream is constructed in memory with the integer portion at the top and the fractional portion at the bottom. Multiple images, e.g., fields for frames, in a sequence may be concatenated in memory using this format. This format supports efficient operations on the video data using the integer portion for 8-bit 4:2:2 video for compatibility with an 8-bit processing system.

Figure 7:
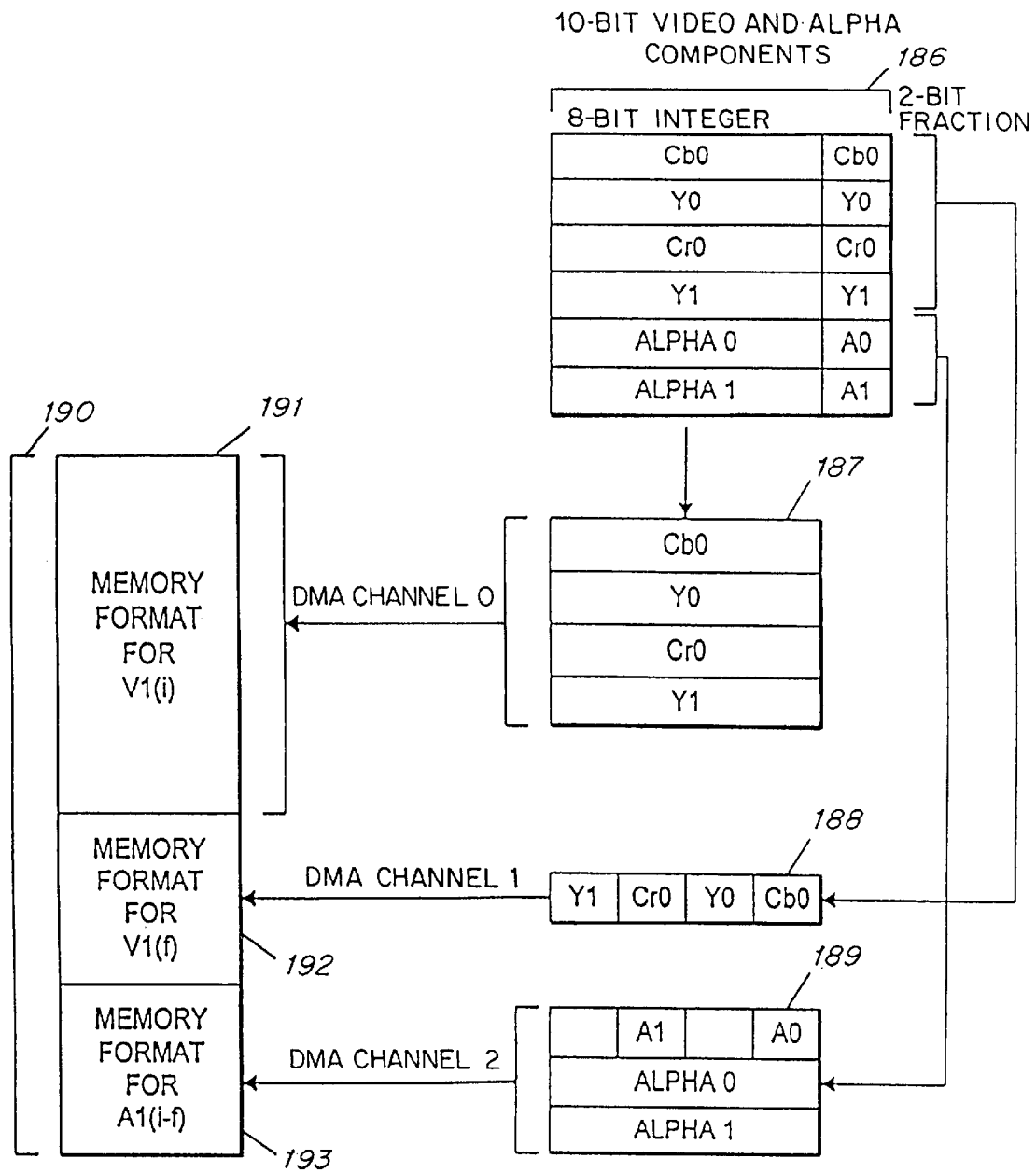
FIG. 7 is a diagram illustrating operation of another embodiment of the circuit of FIG. 5.

FIG. 7 shows an embodiment in which 4:2:2:4 video data 186 is segmented into video integers 187, video fractions 188, and alpha integers and fractions 189 using three DMA channels. This format enables a memory image 190 to be constructed that is compatible with 8-bit 4:2:2 video devices, and 10-bit 4:2:2 and 4:2:2:4 systems by having separate portions in memory for each image for the video integer data 191, video fraction data 192 and alpha integer and fraction data 193.

Figure 8:
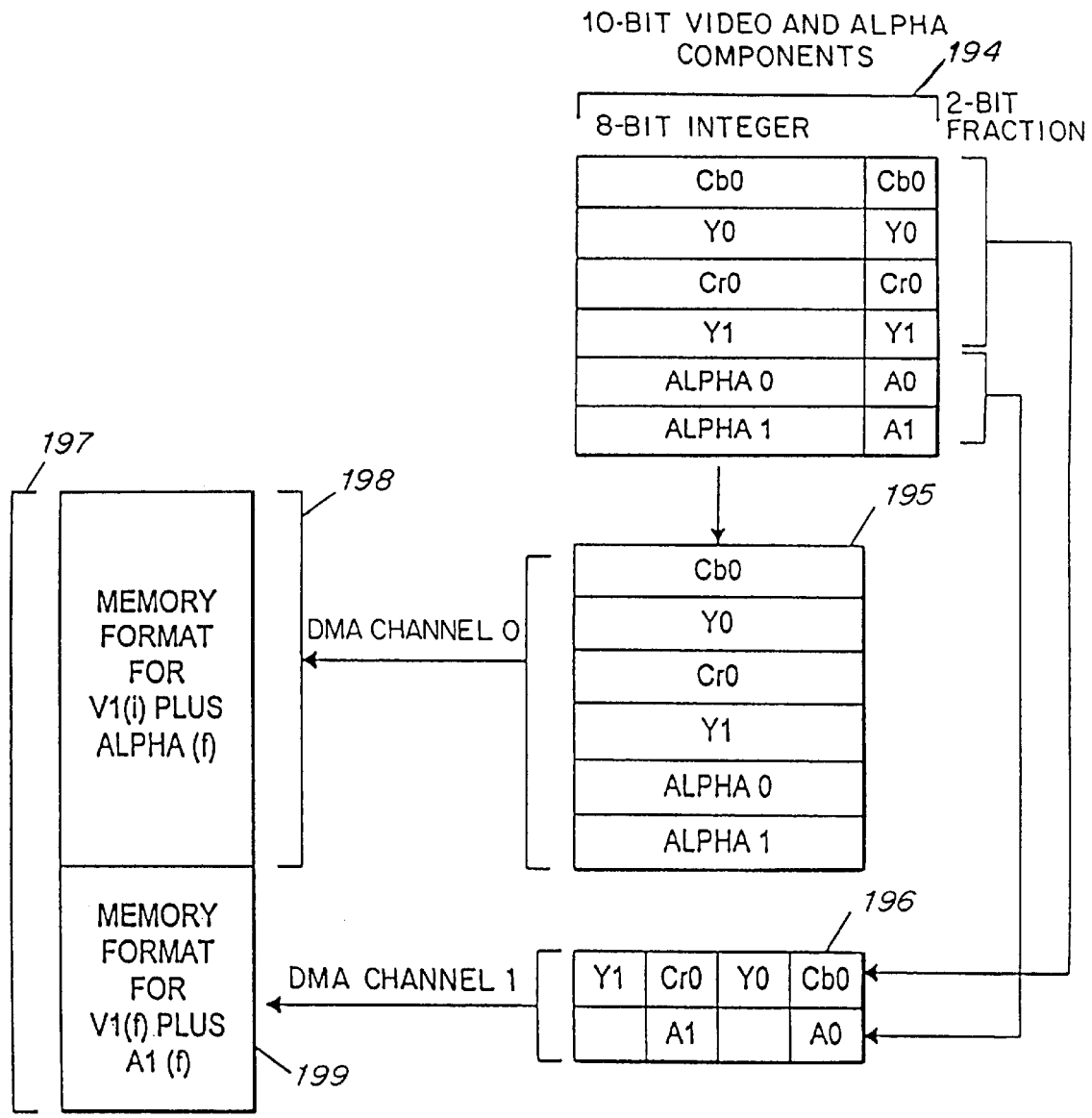
FIG. 8 is a diagram illustrating operation of another embodiment of the circuit of FIG. 5.

Referring to FIG. 8, 4:2:2:4 10-bit video and alpha data 194 are separated into integer data 195 and fractional data 196. This data is written to separate segments 198 and 199 for an image 197 in memory. This memory format enables compatibility between 8-bit and 10-bit systems capable of operating on 4:2:2:4 data segments.

Figure 9:
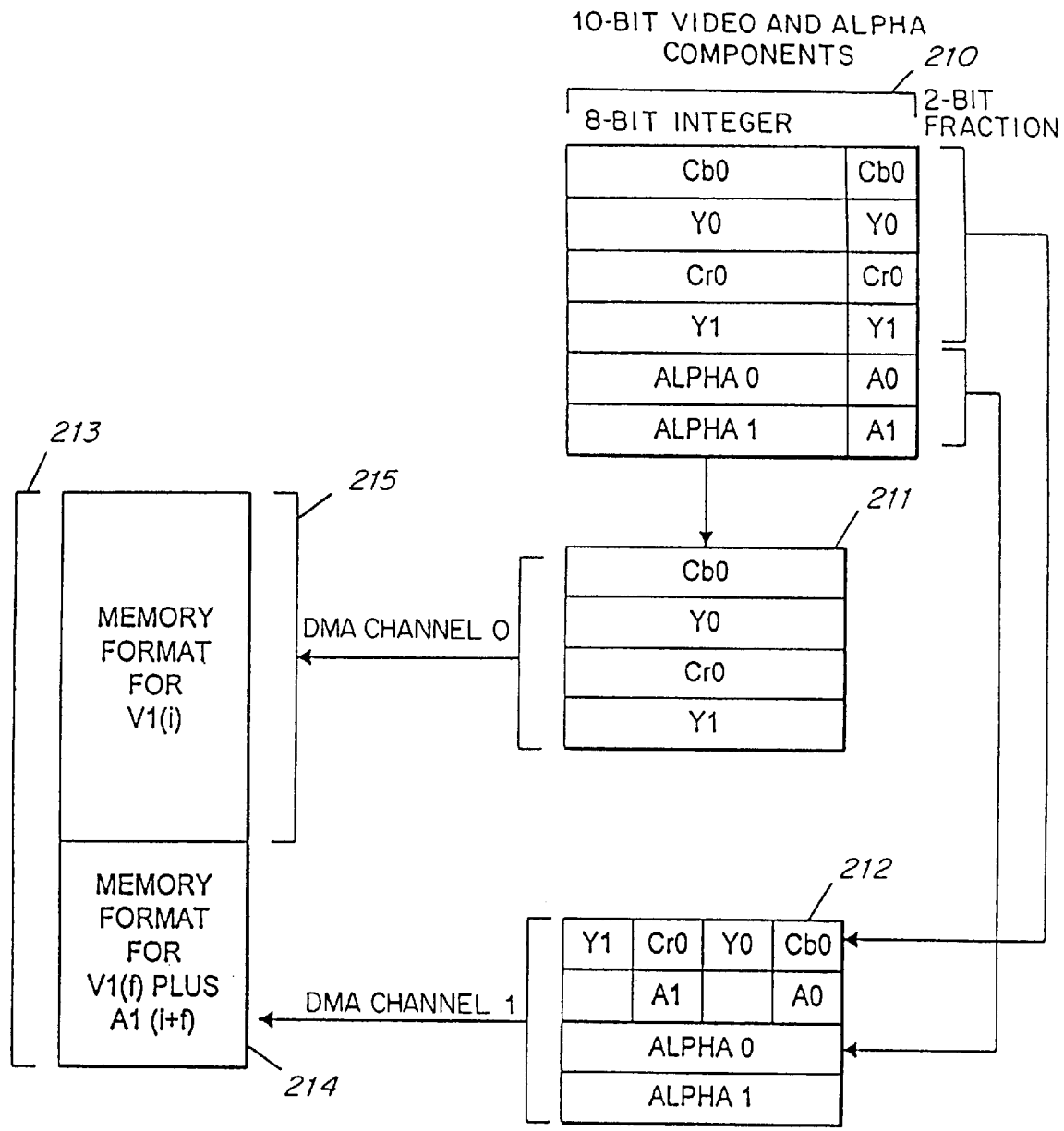
FIG. 9 is a diagram illustrating operation of another embodiment of the circuit of FIG. 5.

FIG. 9 shows an embodiment in which 4:2:2:4 10-bit video and alpha data 210 is separated into video integer data 211 and alpha data and video fraction data 212. This embodiment balances DMA throughput to memory 213 when supporting 4:2:2:4 video formats. The alpha integer and fraction are combined with the 10-bit video fraction in a single memory segment 214. The video integer data is stored in another memory segment 215. In doing so, each DMA is able to transfer its data components at a rate of 27 MHz making possible the use of two separate DMA channels with two separate device interfaces operating at 27 MHz to transport the 4:2:2:4 10-bit video between memory and the device.

Because the video data may be easily separated and combined into its integer and fractional components using these packed data formats, these components may be operated upon or transported separately, in parallel or in series, and then later recombined. This method enables lower precision processing devices to be used in parallel (or sequentially) to process or transports streams of higher precision video data without having a higher precision data path. Higher resolution images may be processed or transported in a similar manner.

For example, 32-bit precision data may be divided into four 8-bit values which may be transported in parallel or serially, and then recombined to provide 32-bit data. A general diagram of one embodiment of a device performing this function is illustrated in FIG. 10. This embodiment describes of 10-bit data using 8-bit devices. Unpacking logic 200 receives packed data and outputs 10-bit data, directing the most significant eight bits (the integer) to an 8-bit device 202. The two least significant bits of the 10-bit data (the fraction) are applied to an 8-bit device 204 as the least significant bits. The output of the second 8-bit device 204 is two-bits (or more bits where the data is of higher precision) which are combined, for example by merging the two signals, with the 8-bit output of device 202 to provide a 10-bit signal which then may be applied to packing logic or another processing device.

Figure 11A:
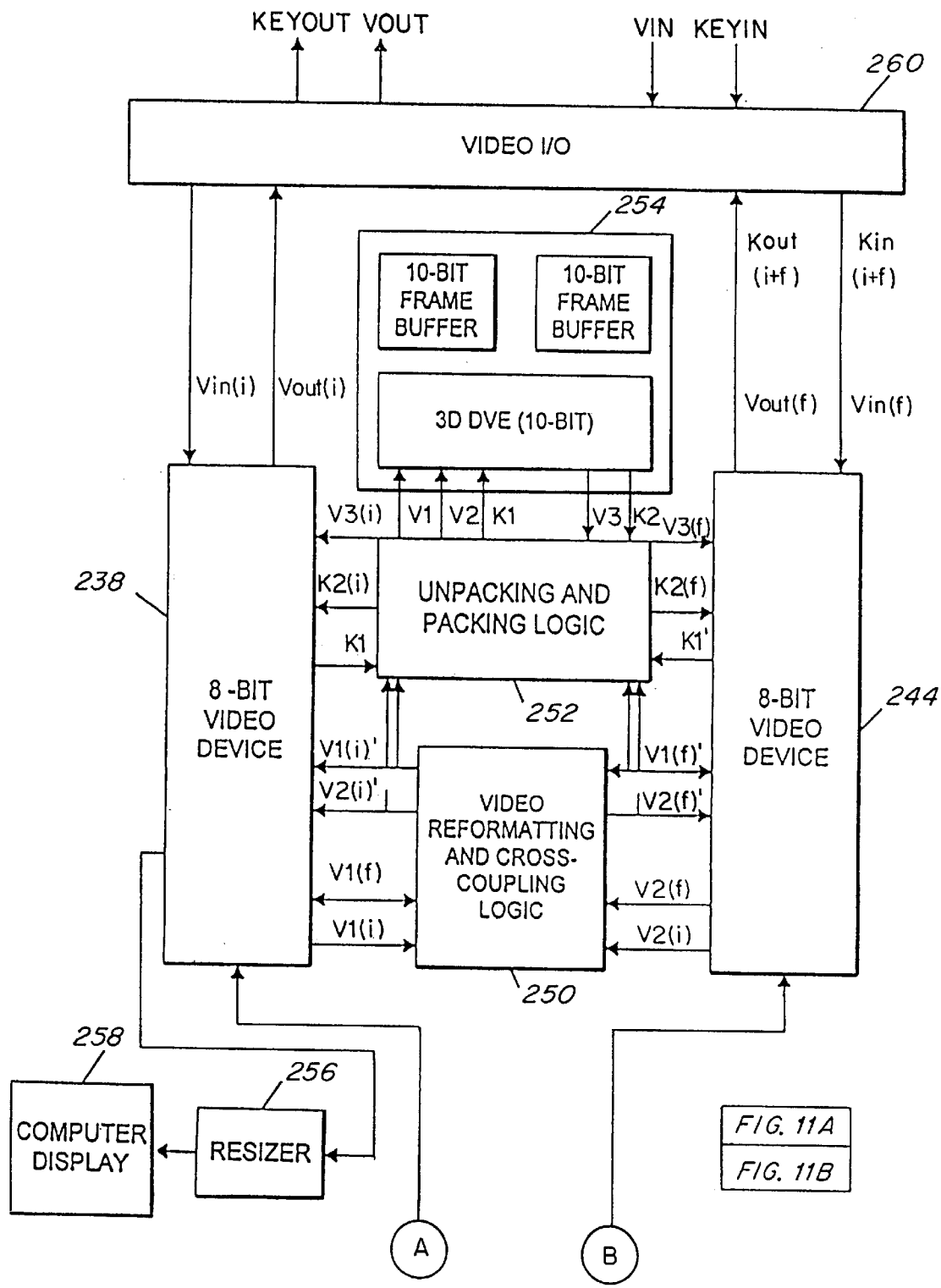
FIG. 11 is a block diagram of one embodiment of the system of FIG. 10.
Figure 11B:
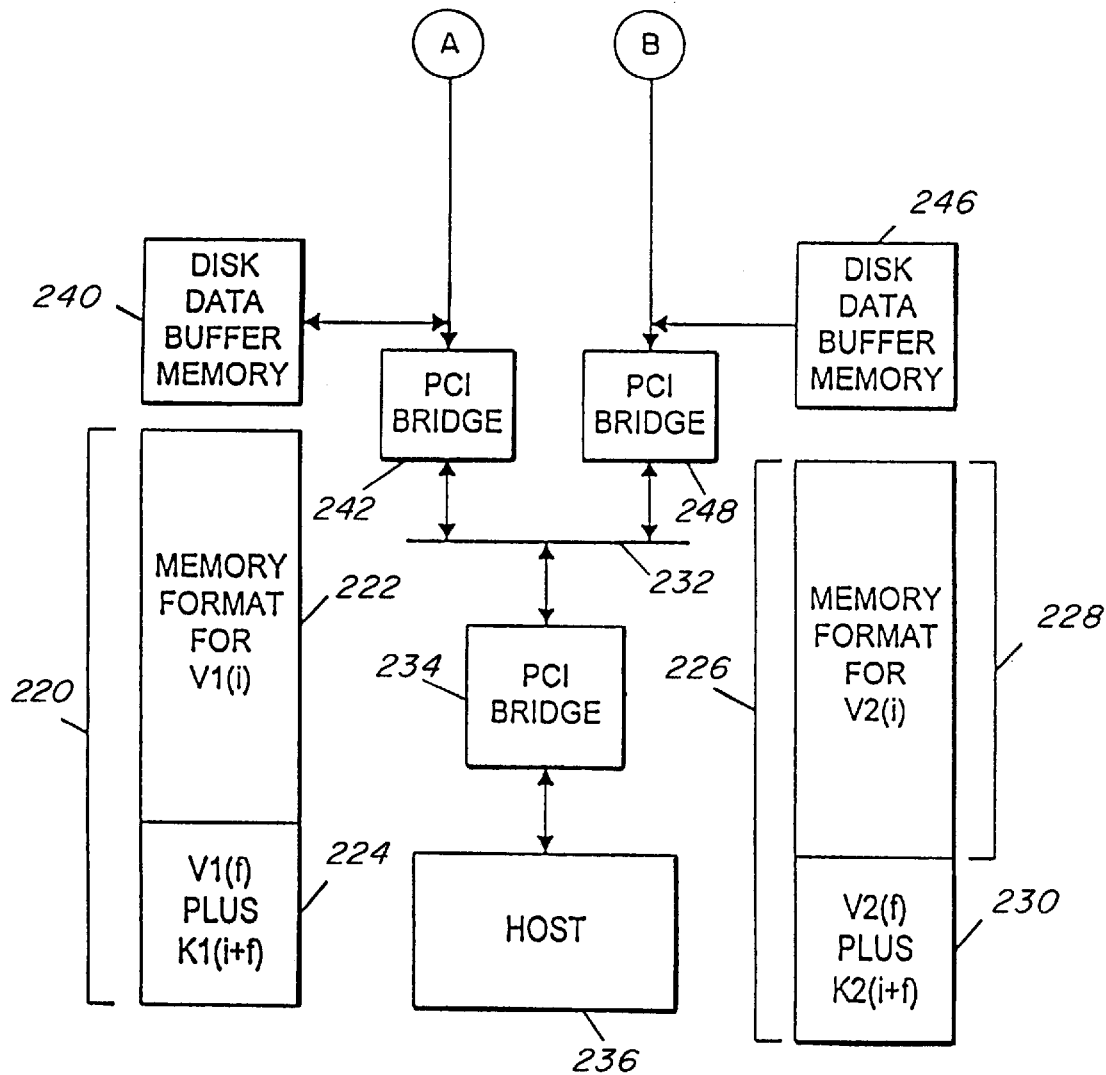

A more detailed diagram of one embodiment of the system in FIG. 10 will now be described in connection with FIG. 11. FIG. 11 illustrates a computer system using a data format, such as described above, to deliver two independent streams of 4:2:2:4 video to a three-dimensional digital video effects device which processes video data using 10-bit precision. This system also may provide two streams of 10-bit 4:2:2:4 video data to external video I/O devices. Data 220 for an image in the first video stream is stored in memory 240 in a format having an integer portion 222 and a fractional portion, with alpha data (both integer and fraction) 224. The data 226 is similarly stored in memory 246 and is formatted into video integer portions 228 and video fractional and alpha integer and fractional portions 230. This data also may be in memory in the host computer which is accessible over a PCI bus 232 through a PCI bridge 234 to the memory in the host 236. Each device 238, 244 has two independent scatter/gather DMA devices that access the memories 240, 246. When these devices are 8-bits, 27 MHz, video devices, the maximum sustained data rate is 27 megabytes per second. The devices 238 and 244 are isolated by the PCI bridges 242 and 248 and may be implemented on separate PCI cards and on separate PCI bus segments in the host platform.

Device 238, using one DMA device, reads the integer portion 222 and transfers the data to video reformatting and cross-coupling logic 250. The second DMA device is used by device 238 to transfer the video fraction and alpha integer and fraction 224 to video reformatting and cross-coupling logic 250. Similarly, device 244 reads from memory 246 to transfer the video integer data 228 and the video fraction and alpha fraction and integer 230 to the logic 250. The logic 250 provides a data path to send all of the fractional and alpha components for both video streams to device 244 and the integer components for both video streams to device 238. All of the data for both video streams are provide to unpacking and packing logic 252. Logic 252 converts the video integers and fractions and alpha integers and fractions to 10-bit video and alpha components to be processed by 10-bit DVE device 254. The output of device 254 is separated by logic 252 into video integer data, which is transferred to device 238, and video fraction and alpha integer and fraction data, which is transferred to device 244. Device 238 transfers the video integer data to video I/O logic 260. Similarly, device 244 transfers the video fraction and alpha integer and fraction data to the video I/O logic 260. The video I/O logic 260 reformats the separate integer and fractional components into 10-bit video and alpha components.

The circuit of FIG. 11 also may be used to capture 10-bit video and alpha streams, commonly referred to as 4:2:2:4 video. Video I/O logic 260 separates 10-bit video into integer and fractions, with the integers passing through device 238 to be stored, using one DMA device, into memory 240. The video fraction and alpha integer and fraction pass through device 244, to logic 250, and in turn to device 238. The other DMA device in device 238 stores the video fraction and alpha integer and fraction in memory 240, to provide memory image 220.

In this embodiment, devices 238 and 244 may be implemented as described in U.S. Patent Application entitled "A Multi Stream Switch-Based Video Editing Architecture," filed Apr. 3, 1998 by Jeffrey D. Kurtze et al. and U.S. Patent Application entitled "A Multi Stream Video Editing System Using Uncompressed Video Data For Real-Time Rendering Performance and For Non Real-Time Rendering Acceleration," filed Apr. 3, 1998, by Craig R. Frink et al., which are hereby incorporated by reference.

One of devices that collects the 8-bit integer components, e.g., device 238, also may have an associated resizer device 256 which can display the video data in a computer display 258. The devices 238 and 244 also may transfer integer and fractional data between a device 260 which packs or unpacks the data into or from a 10-bit format.

Figure 12:
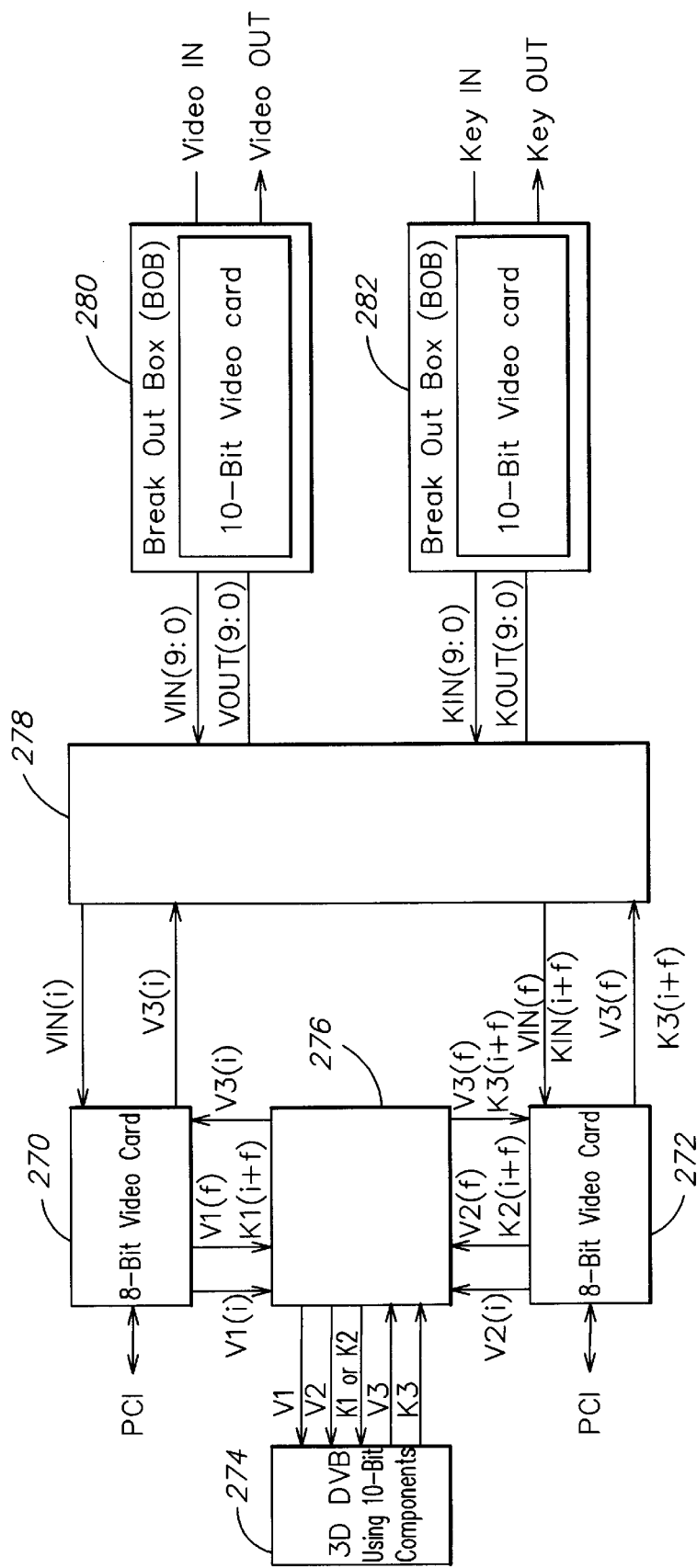
FIG. 12 is a block diagram of another embodiment of the system of FIG. 10.

FIG. 12 illustrates a system that is able to capture, store and play or process 10-bit 4:2:2:4 video in combination with alpha data using two dual-stream 8-bit video devices for data transport. The two 8-bit devices are shown at 270 an 272. A 10-bit three-dimensional digital video effects processing device is shown at 274. The first video device 270 provides integer and fractional data of the first data stream and the alpha data to packing and unpacking logic 276. Video device 272 provides the integer and fractional video data and alpha data for this second video stream to logic 276. Packing and unpacking logic 276 provides two video streams and the alpha data to the digital video effects device 274. The digital video effects device 274 returns the processed video stream and key data to the packing logic 276. Packing logic 276 provides the integer portion of the processed video data to data packing and unpacking logic 278. Video device 272 receives the fractional component of the processed video and the alpha data from packing and unpacking logic 276 and directs this data to packing and unpacking logic 278. This logic 278 may provide a 10-bit video and alpha stream as an output to devices 280 and 282. Similarly, the system of FIG. 12 can act as a capture device receiving input video data and key data from devices 280 and 282. The packing and unpacking logic 278 divides the input video and key data into fractional and integer components. The integer components of the video data are applied to device 270. The fractional components in a key data are applied to processing device 272. Devices 270 and 272 may manage transfer of the received data into data storage on the host system.

The flow of data among the components in the system shown in FIGS. 11 and 12 may be improved by providing flow control. Various systems for providing flow control are described in patent applications cited above.

A system capable of processing 10-bit 4:2:2:4 video also may be constructed from multiple 4:2:2 8-bit video processing devices. Such a system has the advantage of enabling the design of smaller lower cost 4:2:2 two stream 8-bit video processing devices, with bandwidths and processing capability for two streams of 8-bit video. By providing two dual-stream 8-bit video processing devices which provide outputs which are neither truncated or rounded, the processing capability of the system is increased to up to 16-bits of video data, and permits the inclusion of a new format (i.e., 4:2:2:4 video).

Figure 13:
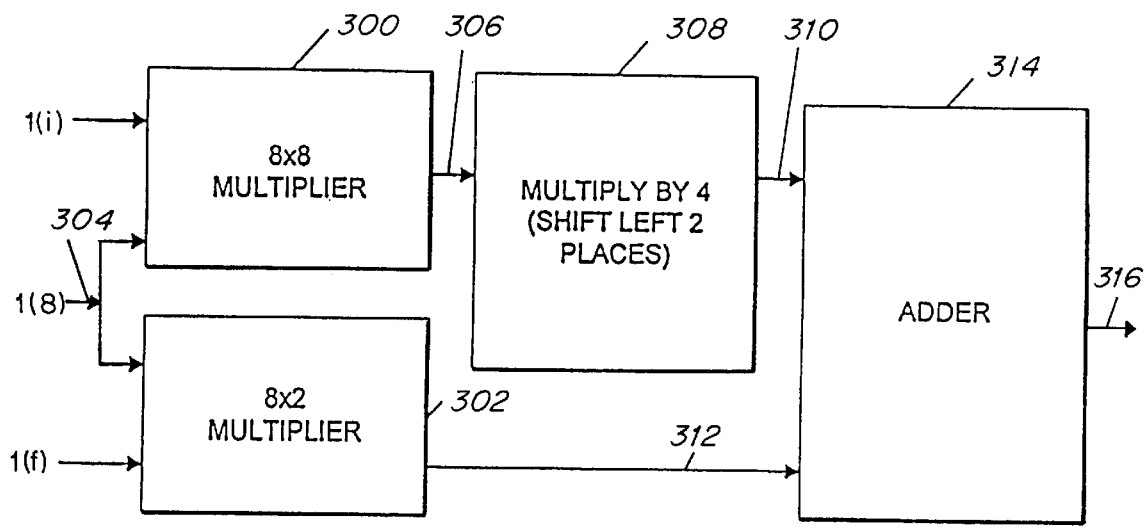
FIG. 13 is a block diagram of another embodiment of the device of FIG. 10.

FIG. 13 illustrates a device for multiplying a 10-bit video component by an 8-bit alpha component using integer and fractional components to provide a 10-bit output. In FIG. 13, the integer portion of video data is input to a multiplier 300 having an 8-bit precision. The fractional data is provided to an 8-bit by 2-bit multiplier 302. Both multipliers receive 8-bit alpha data as indicated at 304. The output 306 of multiplier 300 is extended to 10-bits, for example by shifting left two places through a shift register 308. The output 310 of shift register 308 and the output 312 of multiplier 302 are input to adder 314. The adder provides a 10-bit output 316. In this circuit, the fraction and integer are operated upon separately and then combined at different pipeline stages. This pipelined approach is extensible to higher precision data. The pipeline stages and partial products may be implemented in separate devices to provide higher precision results as long as the fractional precision is carried through the calculation pipeline.

Figure 14:
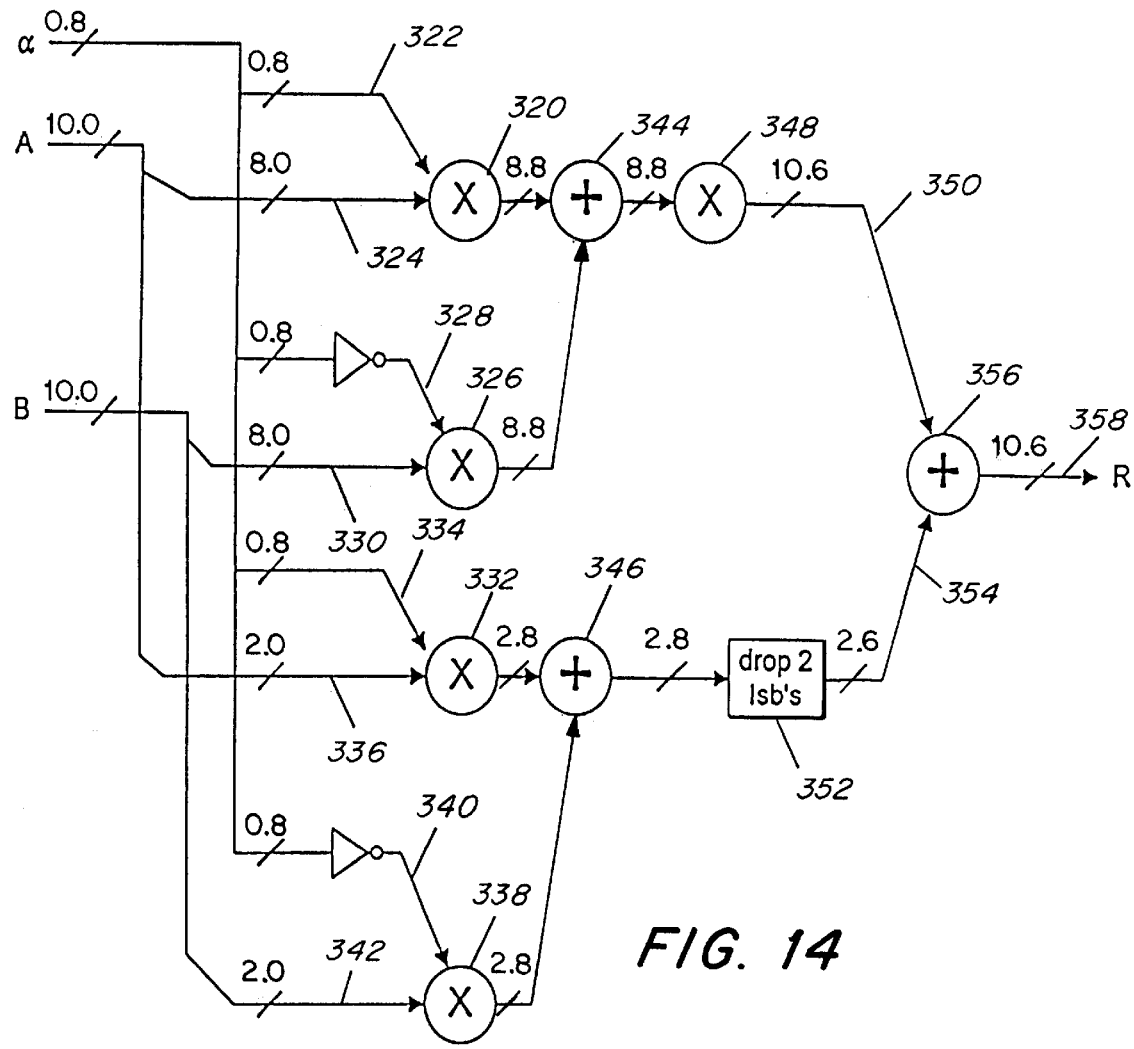
FIG. 14 is a block diagram of one embodiment of a parallel mixer for processing fractional and integer components.

An example mixer, which blends two video streams according to alpha data will now be described in connection with FIG. 14. This mixer operates upon the fractional and integer components in parallel. In this embodiment, a multiplier 320 receives an alpha value 322 and the integer portion 324 of the first video stream. A multiplier 326 receives an inverted alpha value (1−α) 328 and the integer portion 330 of a second video stream. A third multiplier 332 receives the alpha value 334. The fractional portion 336 of the first video stream is also input to the multiplier 332. The multiplier 334 receives the inverted alpha value (1−α) 340 and the fractional portion 342 of the second data stream. The outputs of multipliers 322 and 326 are connected to the inputs of an adder 344. The outputs of multipliers 332 and 338 are connected to the inputs of an adder 336. The output of multipliers 320 and 326 include an 8-bit integer and an 8-bit fraction. The outputs of multipliers 332 and 338 are a 2-bit integer and an 8-bit fraction. The output of adder 344, having an 8-bit integer and an 8-bit fraction, is shifted left by a shift register 348 (or is multiplied by four) to provide an output 350 having a 10-bit integer and 6-bit fraction. The output of adder 346 is a 2-bit integer and an 8-bit fraction from which the two least significant bits are dropped, as indicated at 352, to provide a 2-bit integer and a 6-bit fraction, as indicated at 354. Signals 350 and 354 are connected to the inputs of an adder 356 which provides a 10-bit integer and 6-bit fraction result 358.

Figure 15:
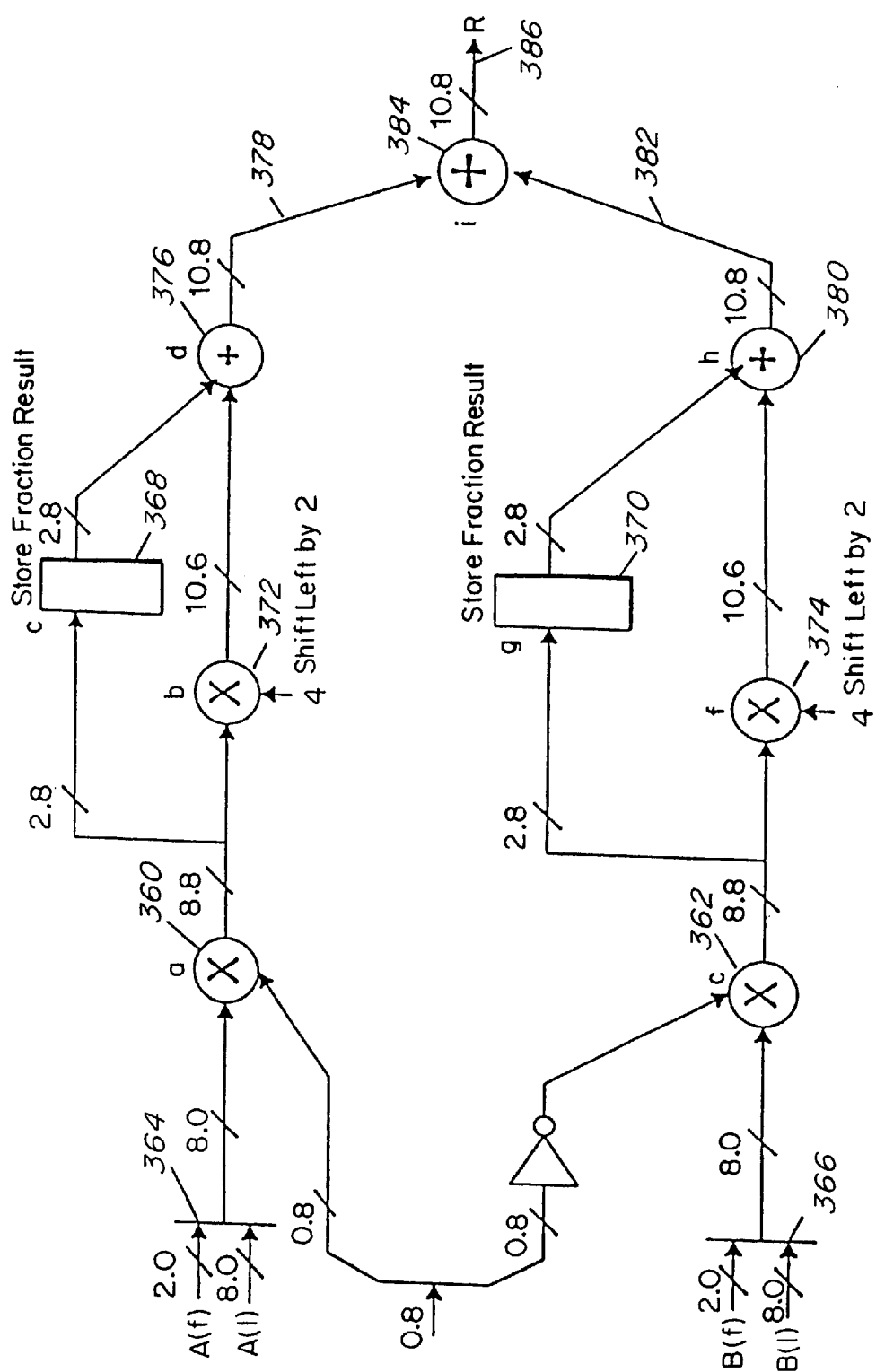
FIG. 15 is a block diagram of one embodiment of a sequential mixer for processing fractional and integer components.

An embodiment of a sequential mixer is shown in FIG. 15. In this embodiment, the fractional and integer data share multipliers 360 and 362, at different points in time. In this embodiment, a multiplexer 364 selects between the fractional and integer components of a first video data stream. A second multiplexer 366 selects between the fractional and integer components of the second video stream. In this embodiment, the fractional data is processed first, although the integer data could be processed first in an alternate embodiment. The multiplexers 364 and 366 are first set to provide the fractional data to multipliers 360 and 362. The alpha data also is received by multipliers 360 and 362. The output of multiplier 360 is stored in register 368. The output of multiplier 362 is stored in register 370. Next, multiplexers 364 and 366 are set to provide the integer data to multipliers 360 and 362. The output of multiplier 360 is then shifted left by two bits through shifter 372. The output of multiplier 362 is shifted left by two bits by multiplier 374. Adder 376 combines the fractional result from register 368 and the output of shifter 372 to provide a 10-bit integer, 8-bit fraction result 378. An adder 380 receives the fractional result from register 370, and the output of multiplier 374 to provide a 10-bit integer, 8-bit fraction result 382. Signals 378 and 382 are applied to the inputs of an adder 384 to provide a 10-bit integer, 8-bit fraction result 386.

These and other circuits may be provided to process higher precision data using lower precision processing components. These embodiments are particularly useful where the lower precision processing components are scalable to operate in parallel. The packed data formats also enable video data of various precisions to be used in systems of interconnected devices using various data processing and data transmission paths.

Having now described a few embodiments, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method for processing video data defined by a plurality of components having a first precision using video devices operating on the video data using a second precision smaller than the first precision, wherein the video data is stored in a format defining an integer portion defined by higher order bits of a video component, wherein the precision of the integer portion is defined by the second precision and a fractional portion defined by lower order bits of the data for a video component, wherein the precision of the fractional portion is defined by a difference between the first precision and the second precision data, the method comprising the steps of:

processing the integer portion of the video data using a first video processing device;

processing the fractional portion of the video data using a second video processing device;

combining results obtained by processing the fractional portion and the integer portion into data in first precision.

2. An apparatus for processing video data defined by a plurality of components having a first precision using video devices operating on the video data using a second precision smaller than the first precision, wherein the video data is stored in a format defining an integer portion defined by higher order bits of a video component, wherein the precision of the integer portion is defined by the second precision, and a fractional portion defined by a lower order bits of the video component, wherein the precision of the fractional portion is defined by a difference between the first precision and the second precision, the apparatus comprising:

means for separating the integer portion of the video data from the fractional portion of the video data;

a first video processing device having an input for receiving the integer portion of the video data and an output for providing a first result;

a second video processing device having an input for receiving the fractional portion of the video data and an output for providing a second result; and means for combining the first result and the second result into results in the first precision.

* * * * *